May 21, 1929.  W. A. ANDERSEN  1,714,341
STATION INDICATOR
Filed Nov. 21, 1922  24 Sheets-Sheet 7
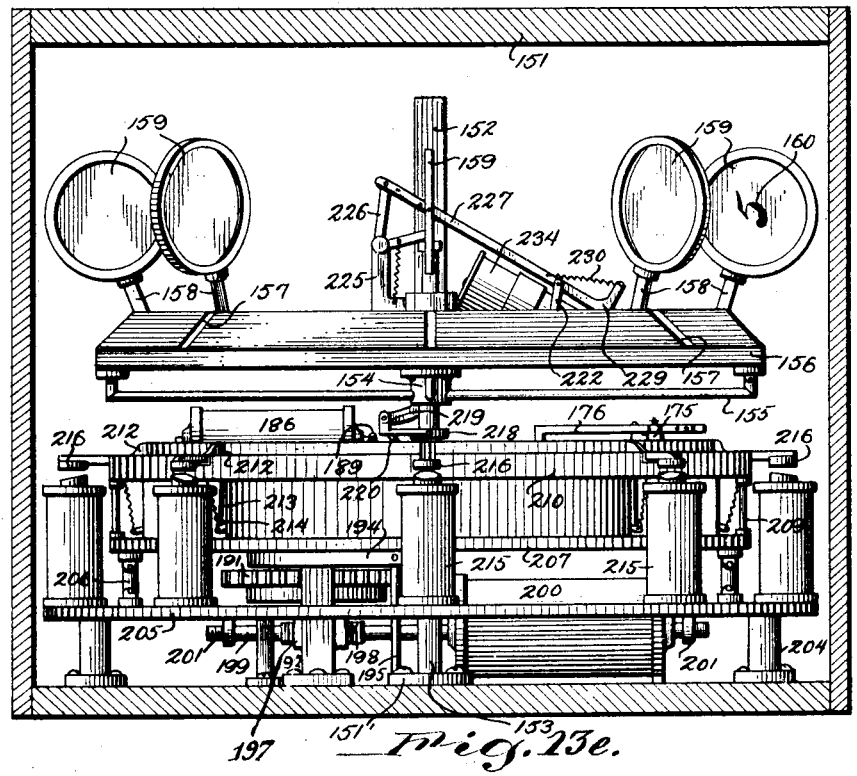
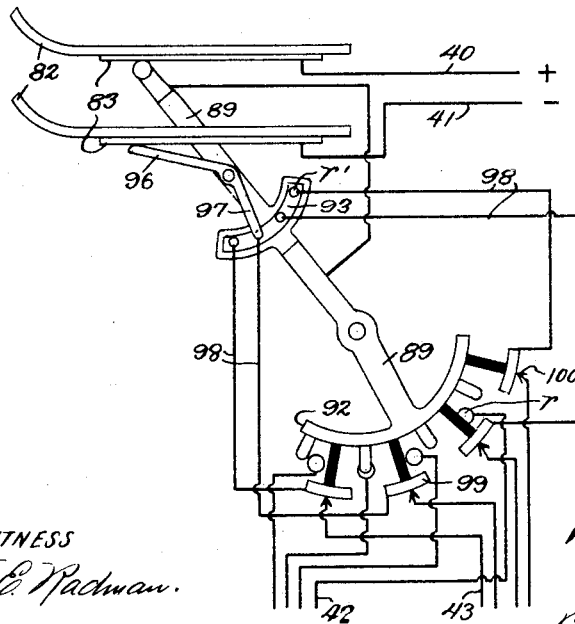
WITNESS
Inventor
WILHELM A ANDERSEN.
Attorney

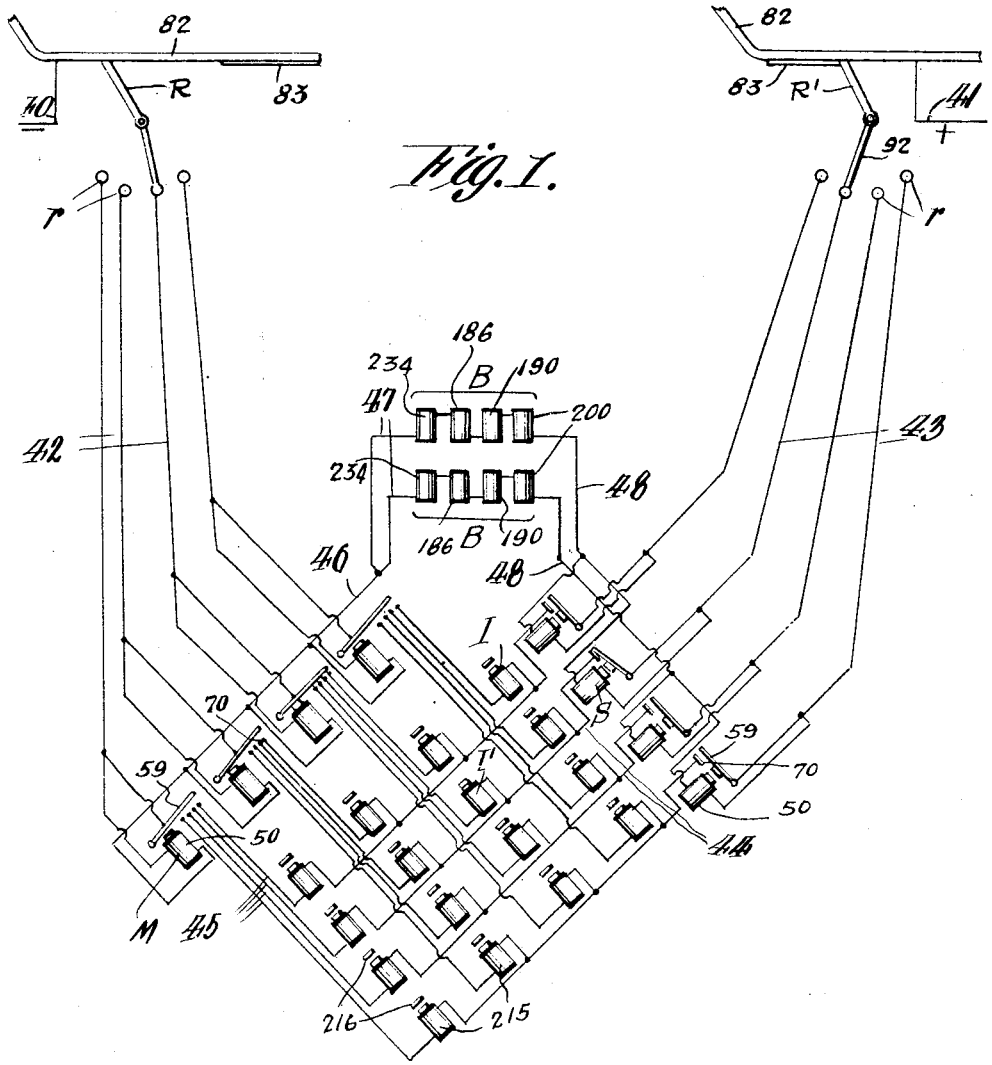

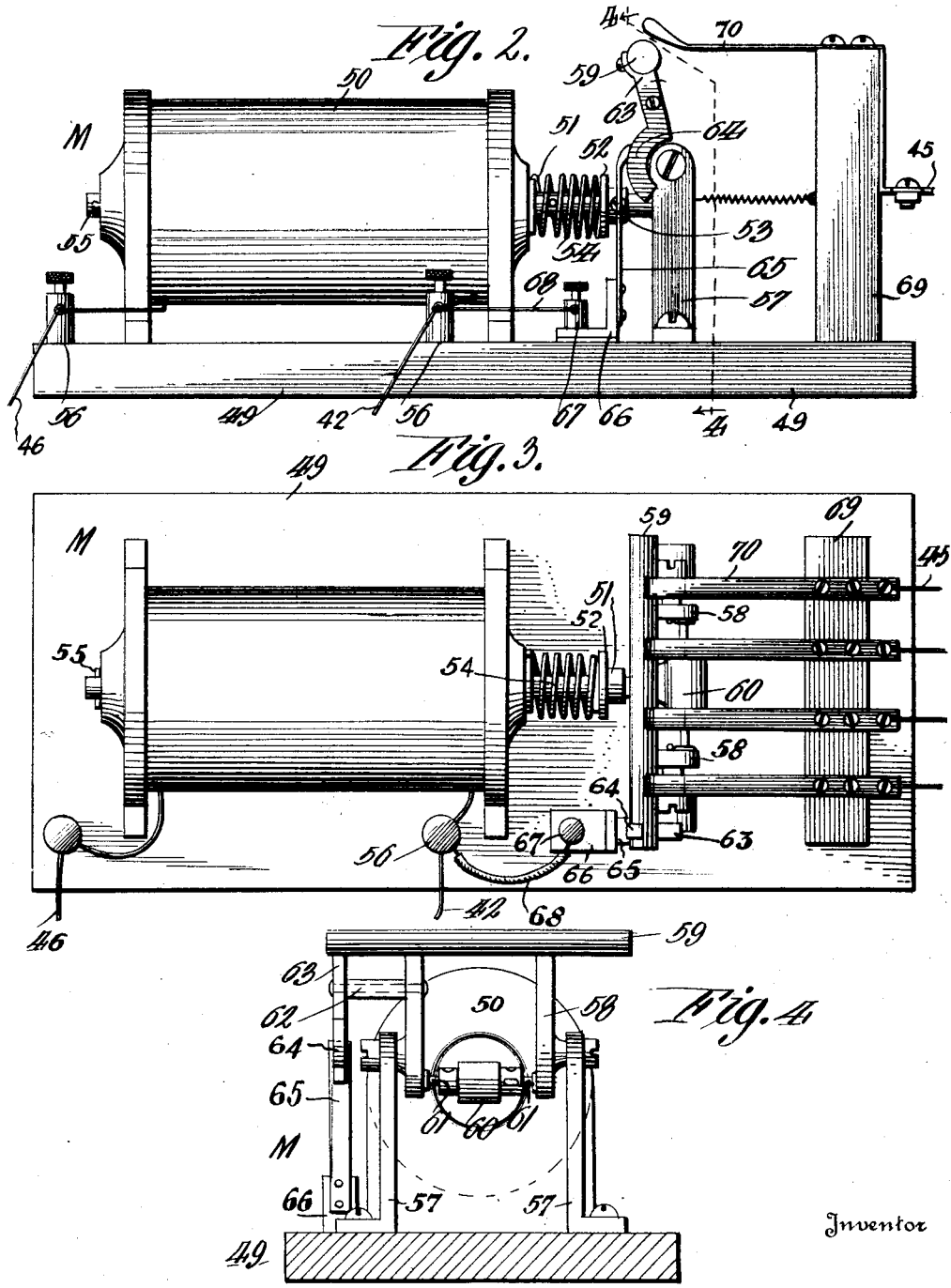

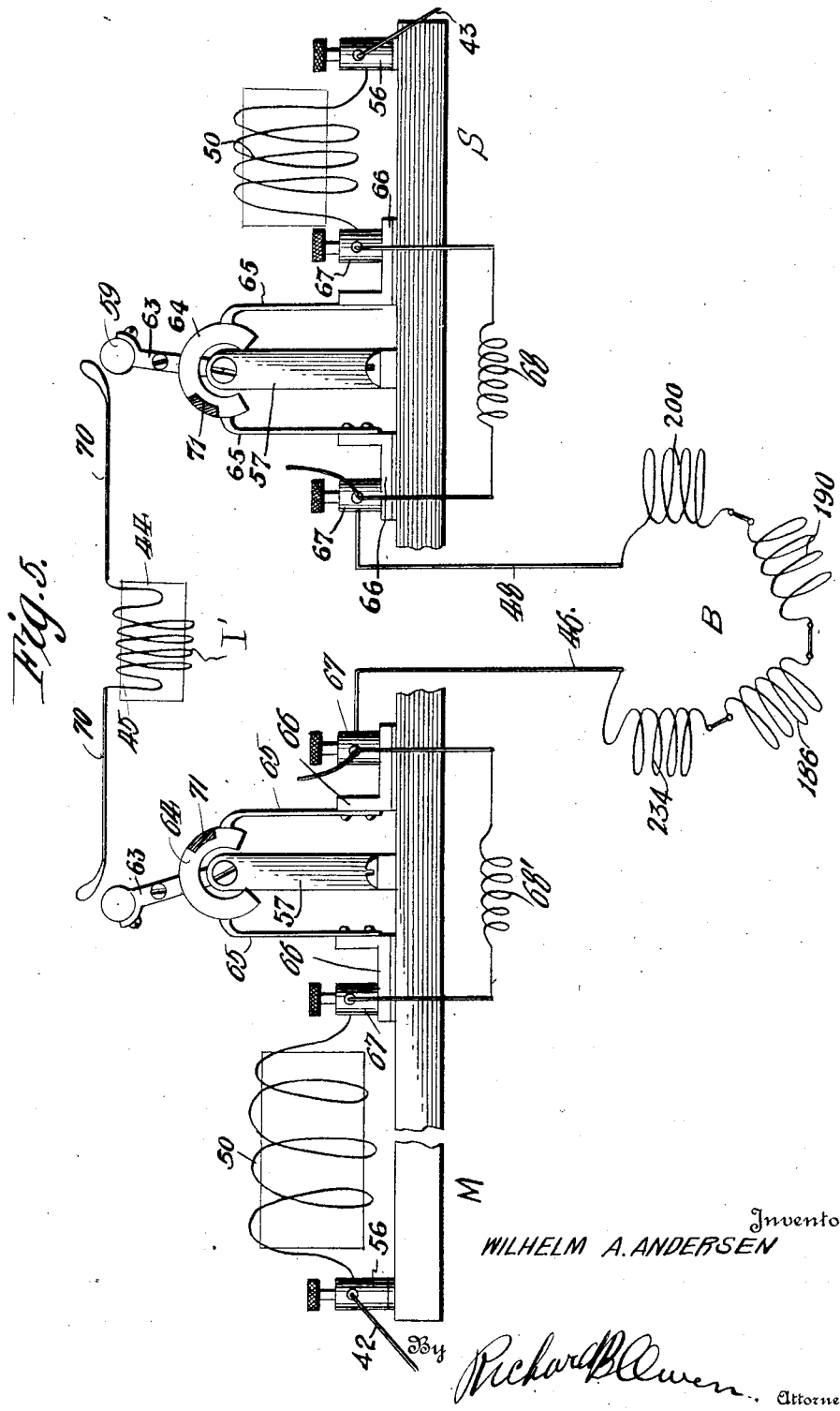

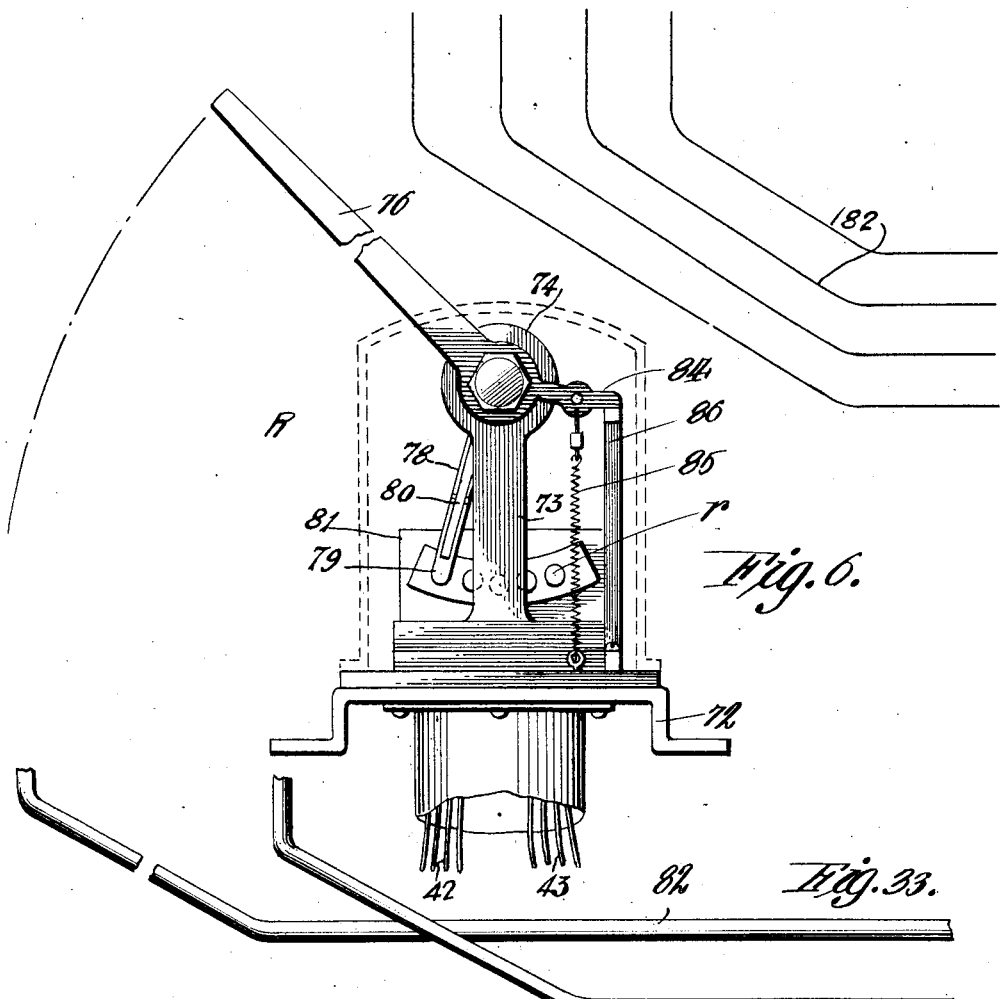
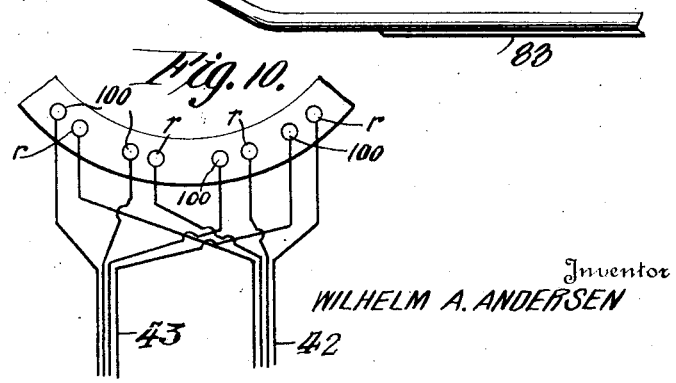

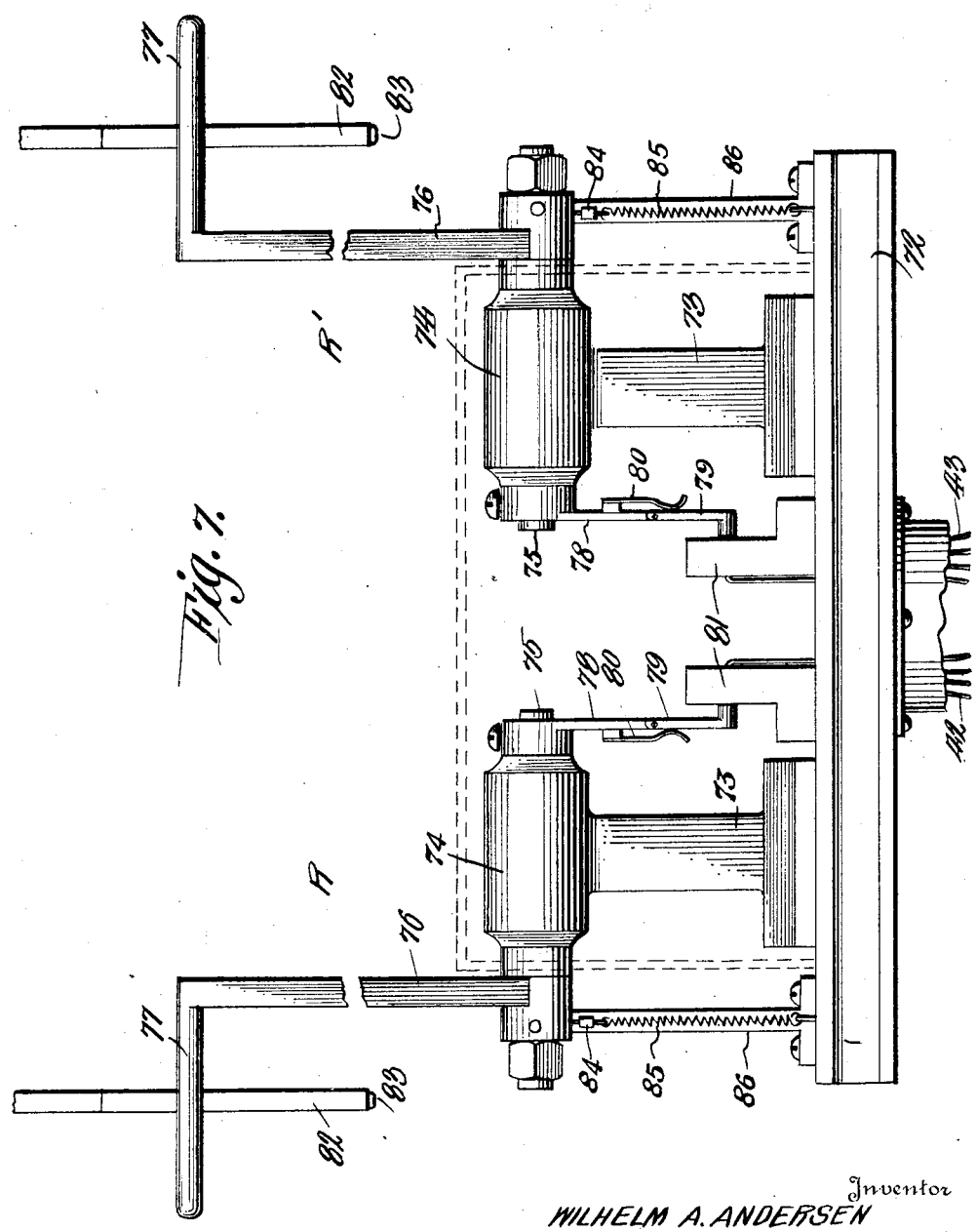

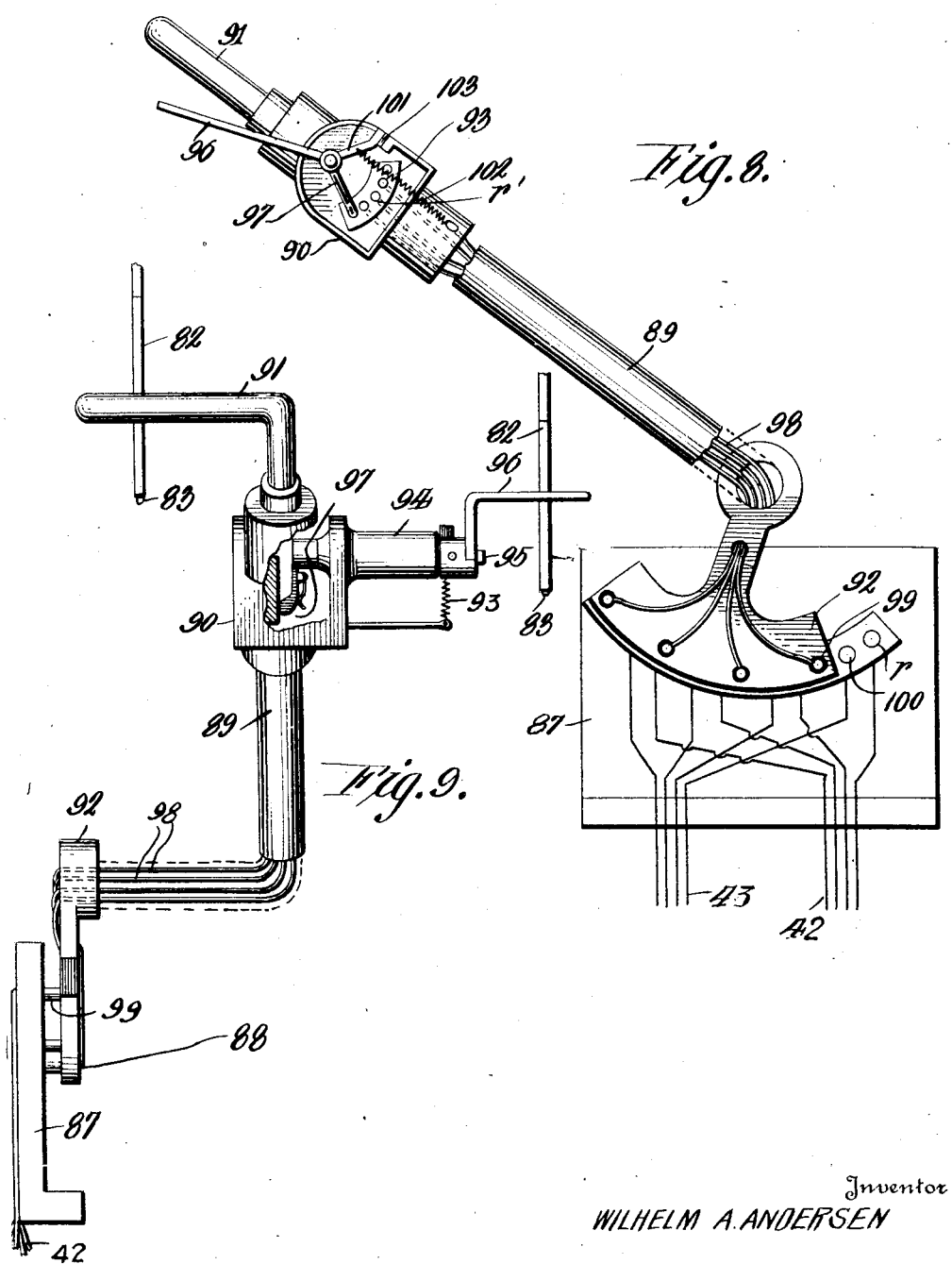

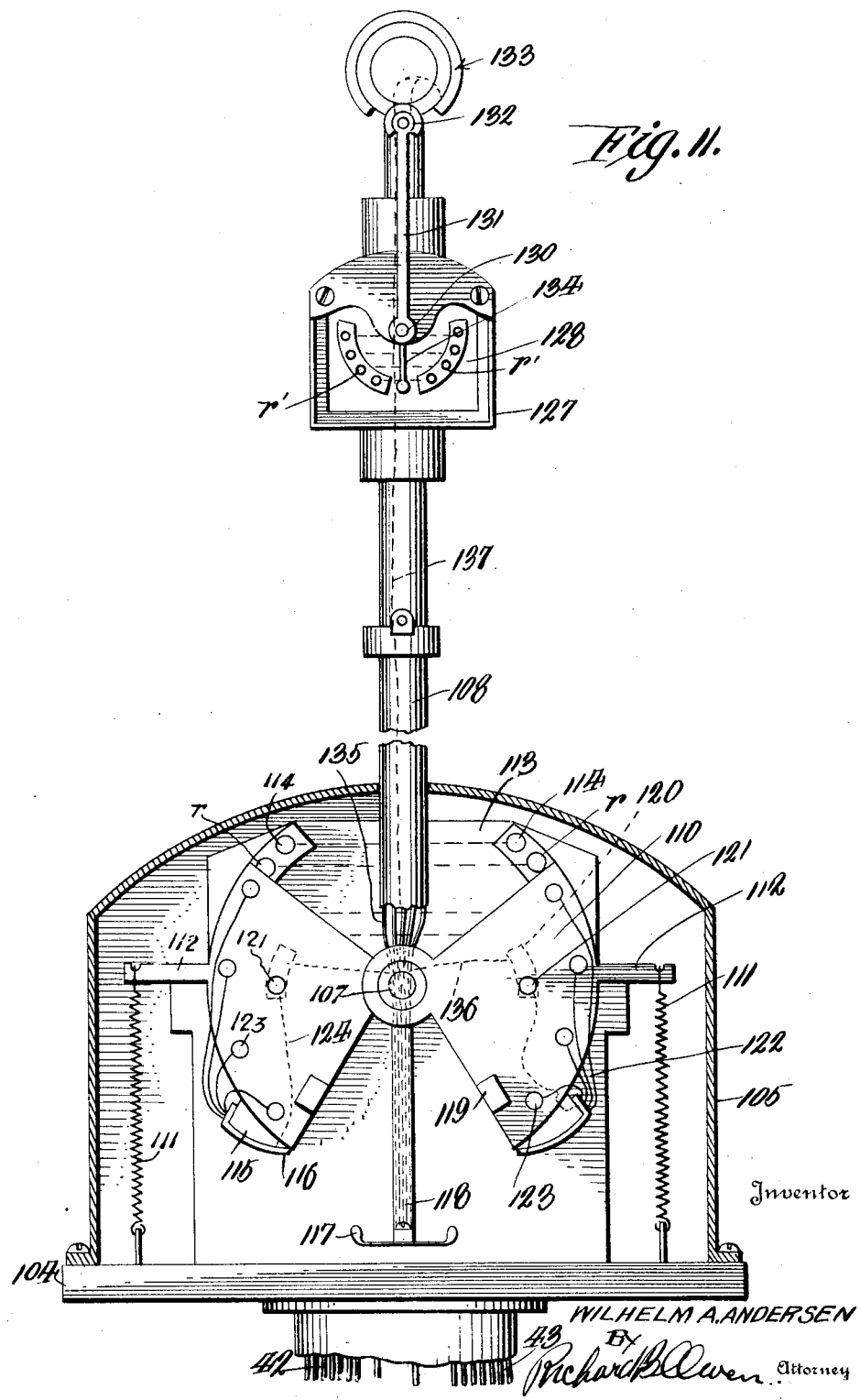

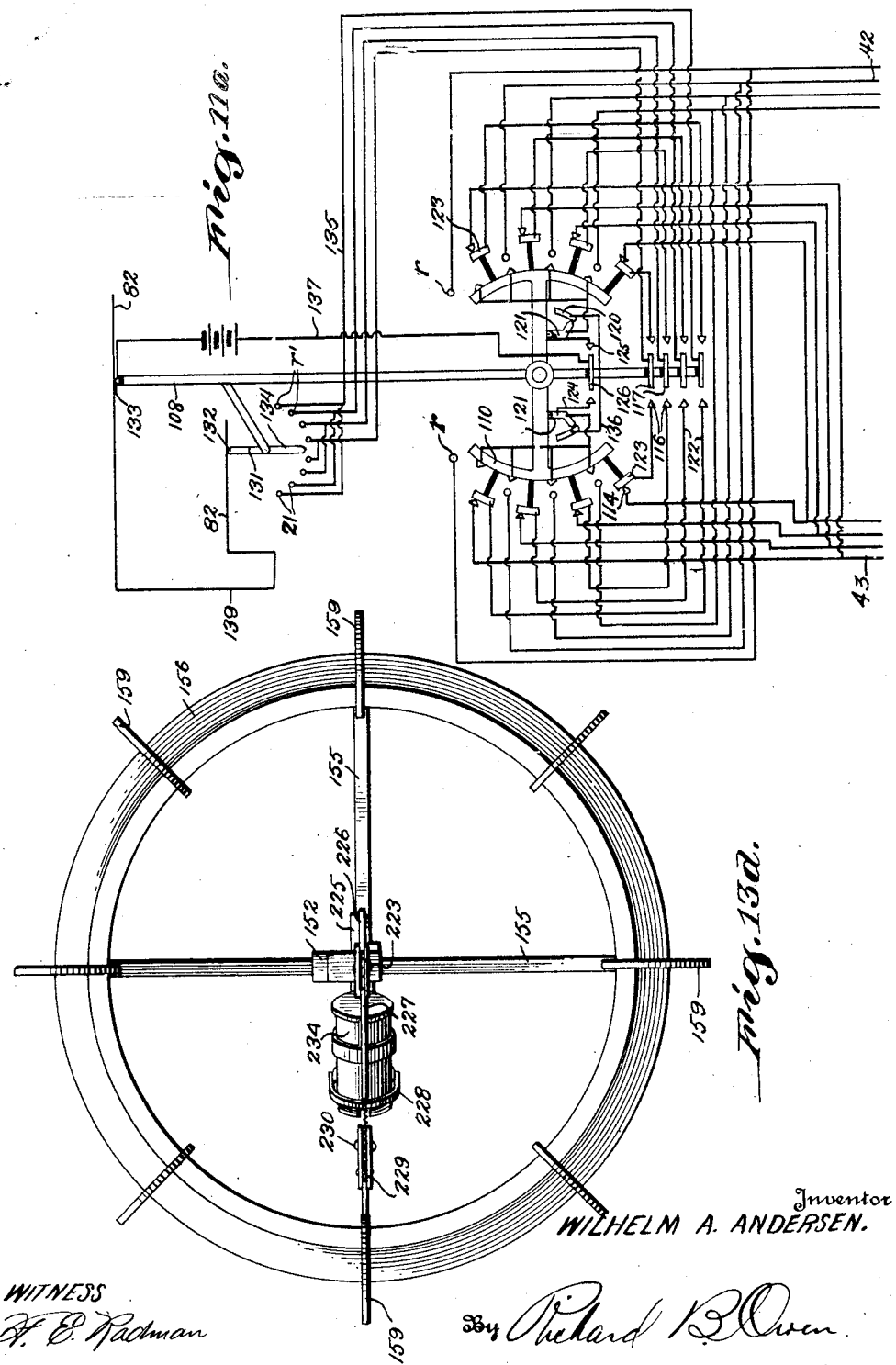

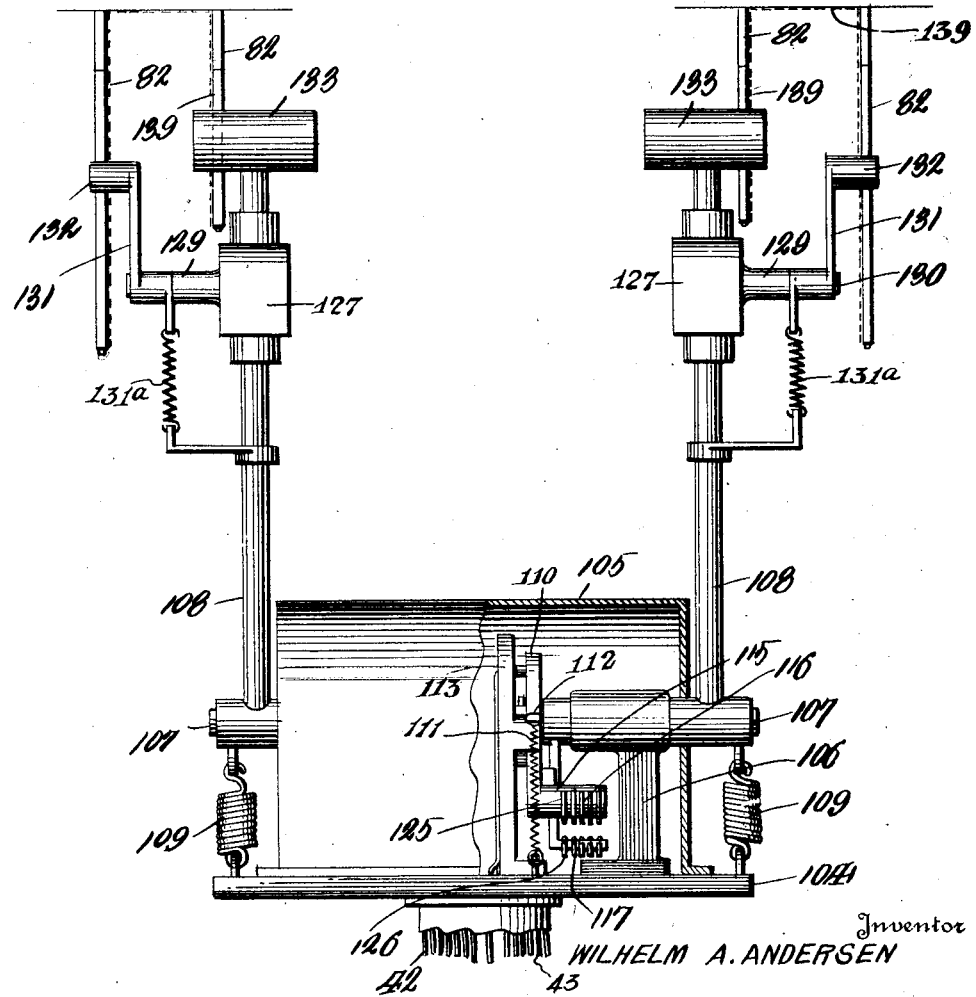

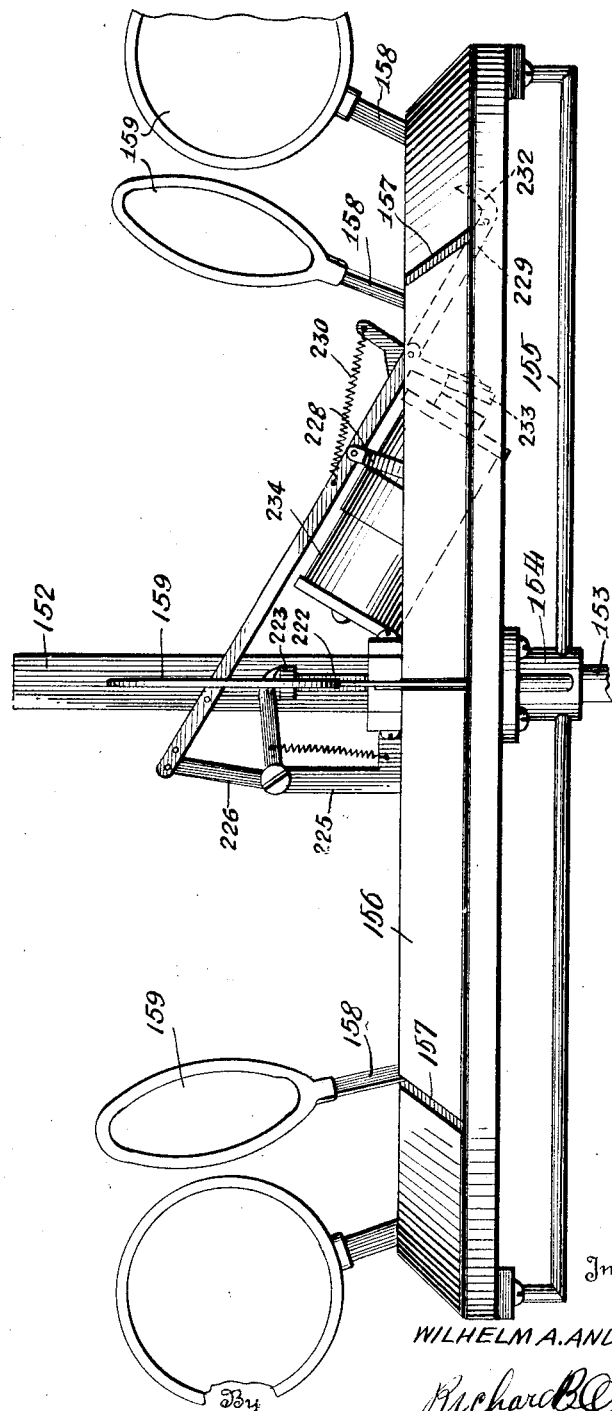

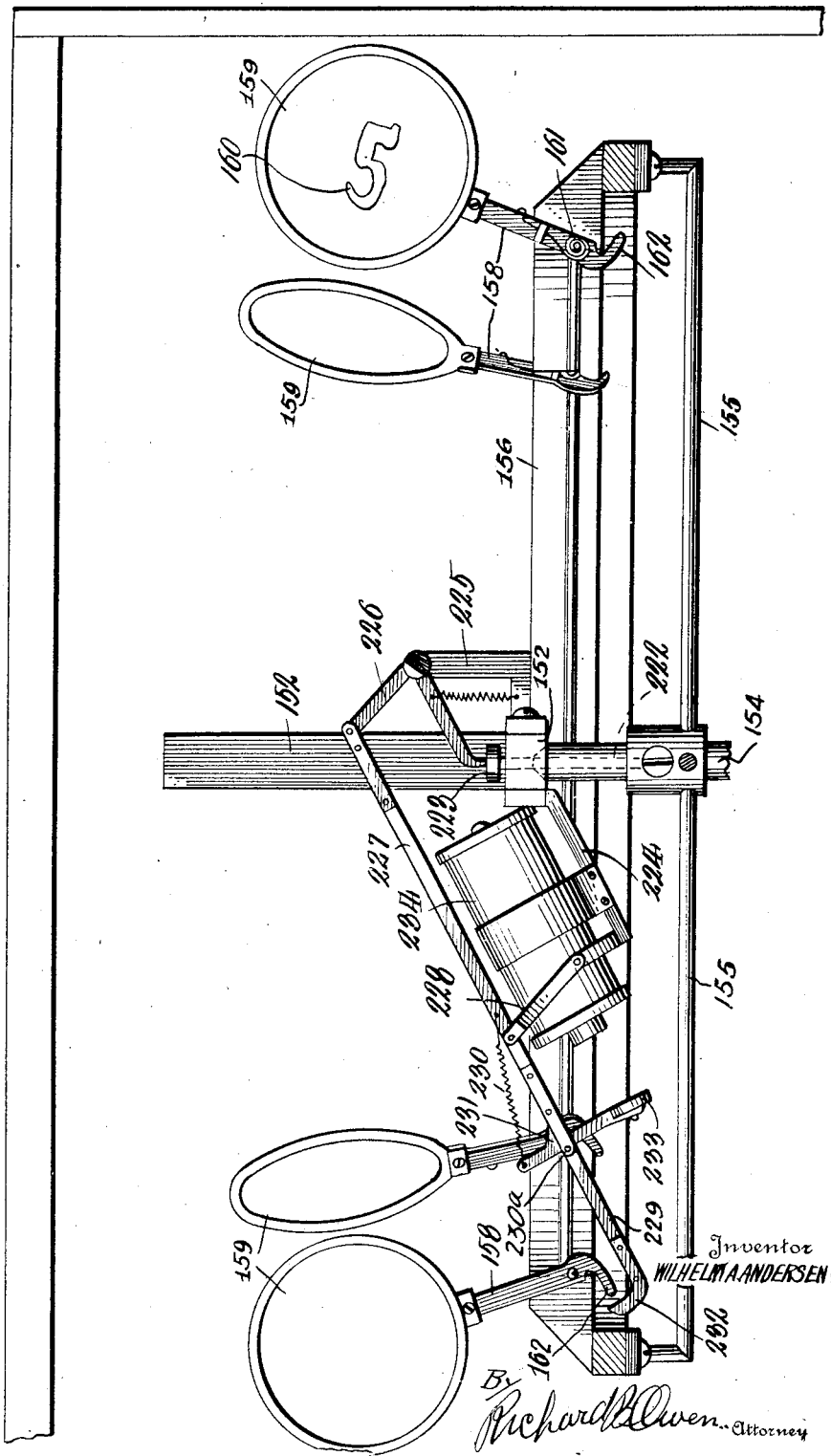

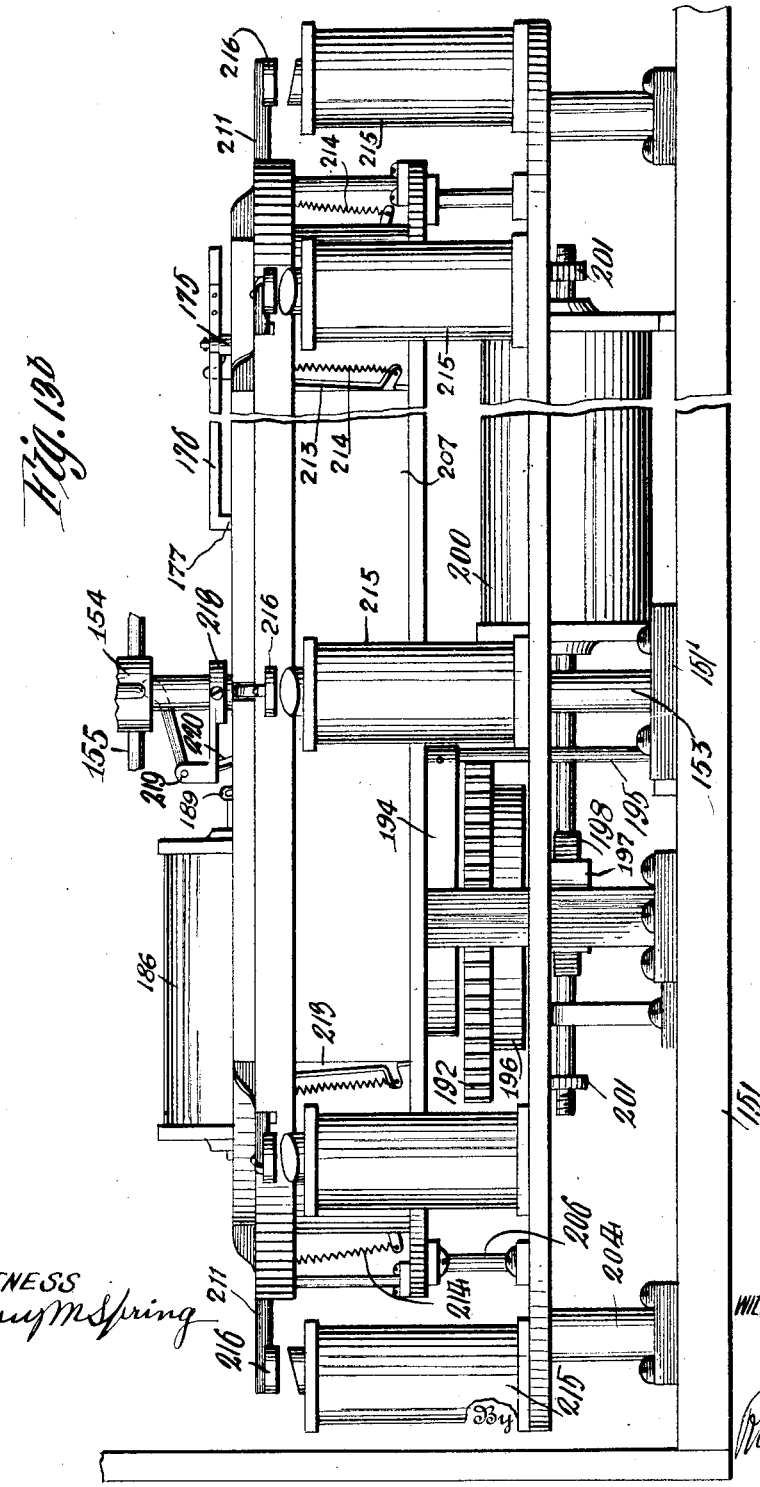

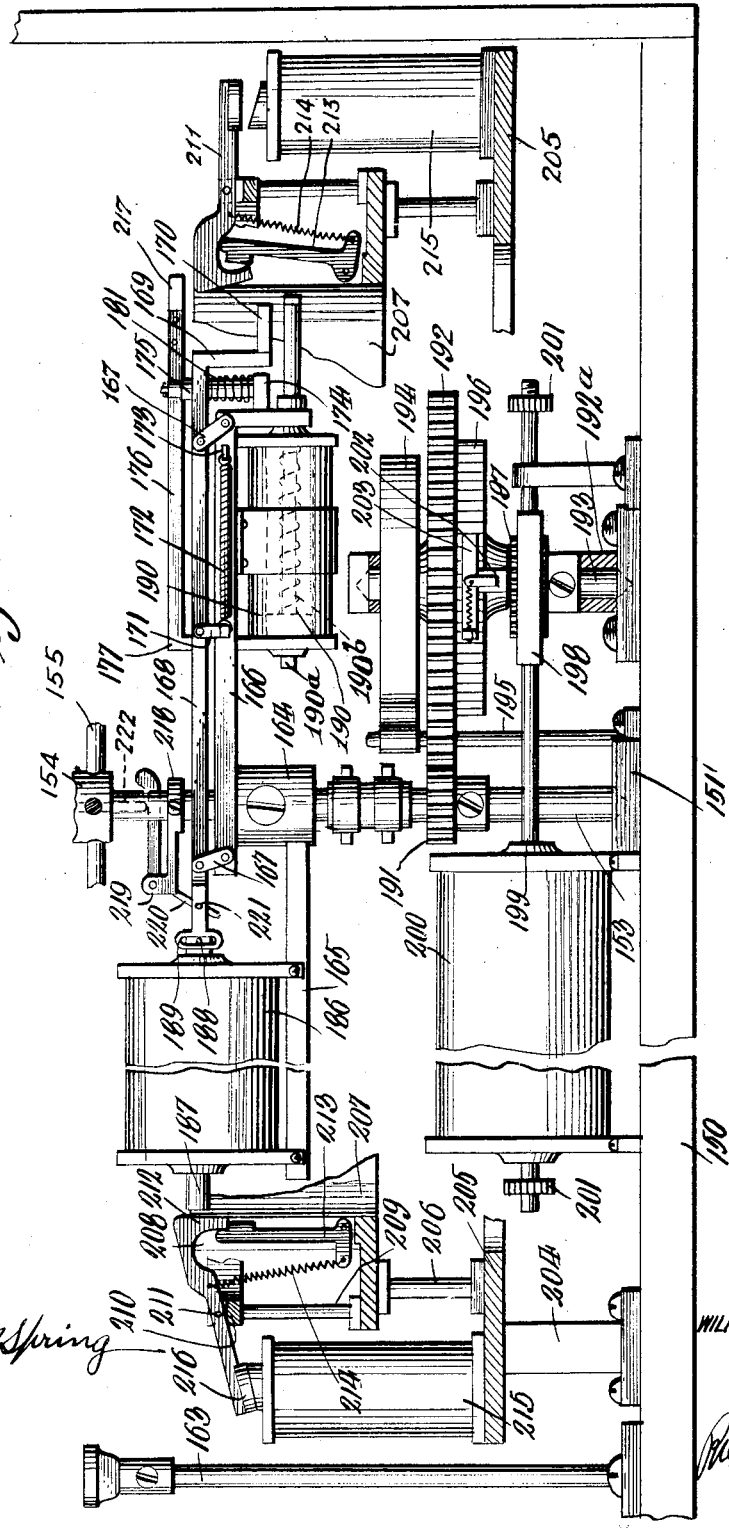

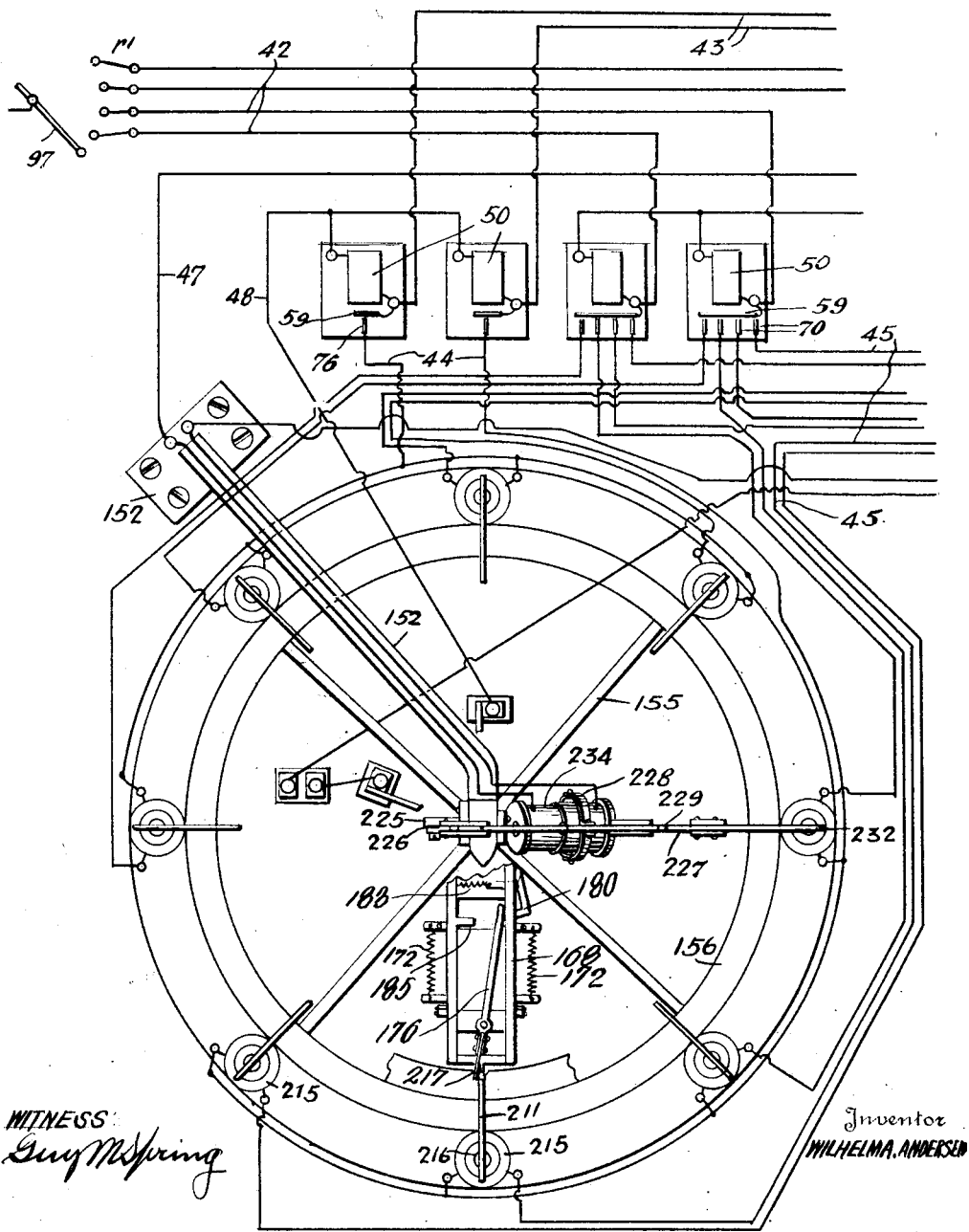

Fig. 14ª.

May 21, 1929.  W. A. ANDERSEN  1,714,341
STATION INDICATOR
Filed Nov. 21. 1922  24 Sheets-Sheet 17
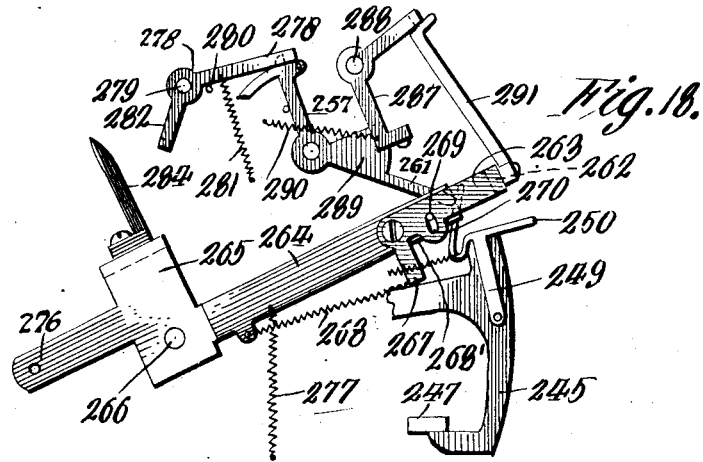
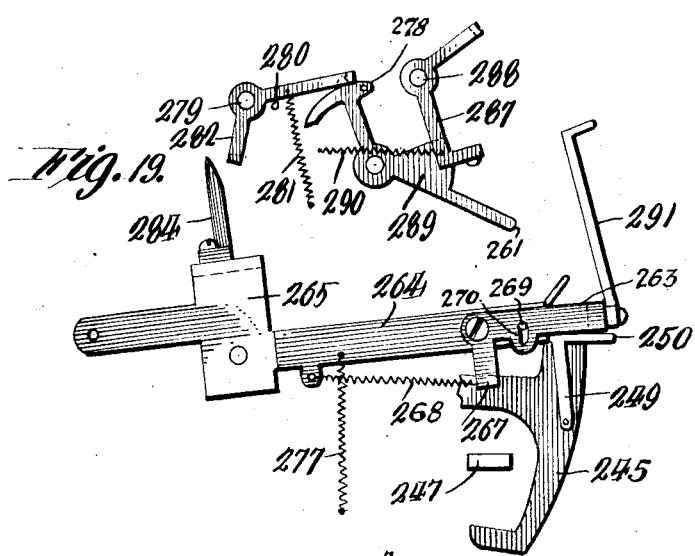
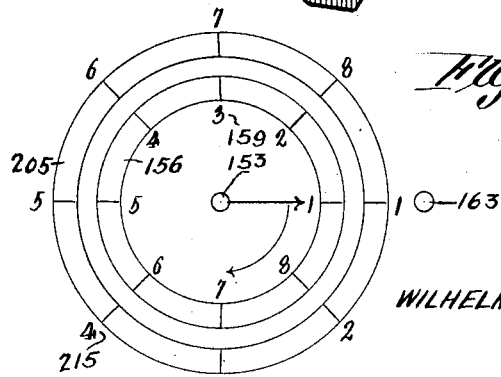
WITNESS.
Inventor
WILHELM A. ANDERSEN
By
Attorney May 21, 1929.  W. A. ANDERSEN  1,714,341
STATION INDICATOR
Filed Nov. 21, 1922   24 Sheets-Sheet 18
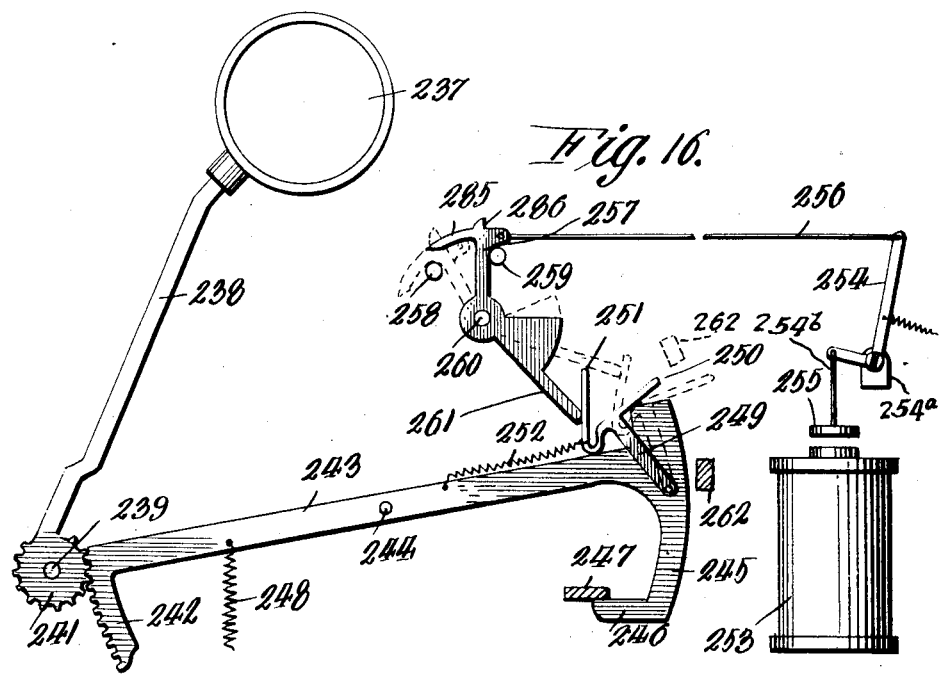
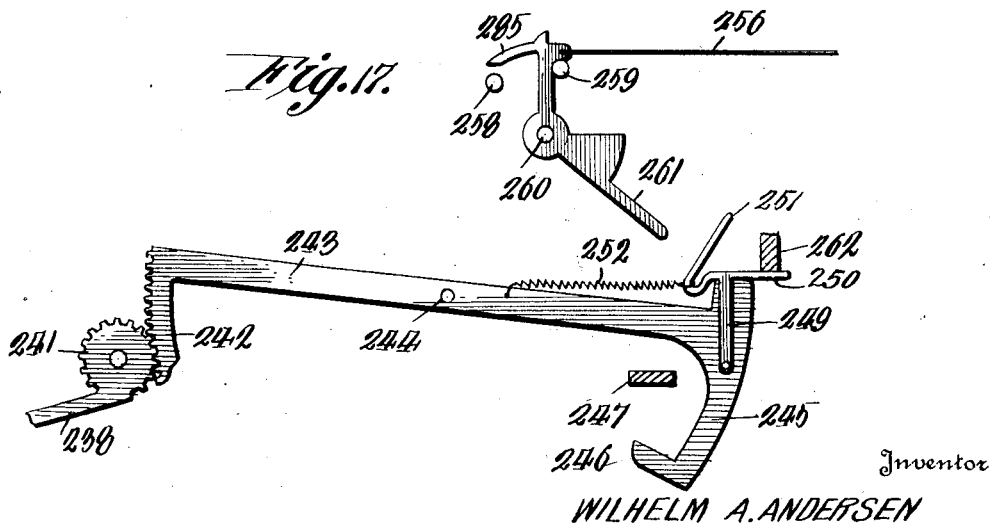
Inventor
WILHELM A. ANDERSEN
By Richard B. Owen, Attorney

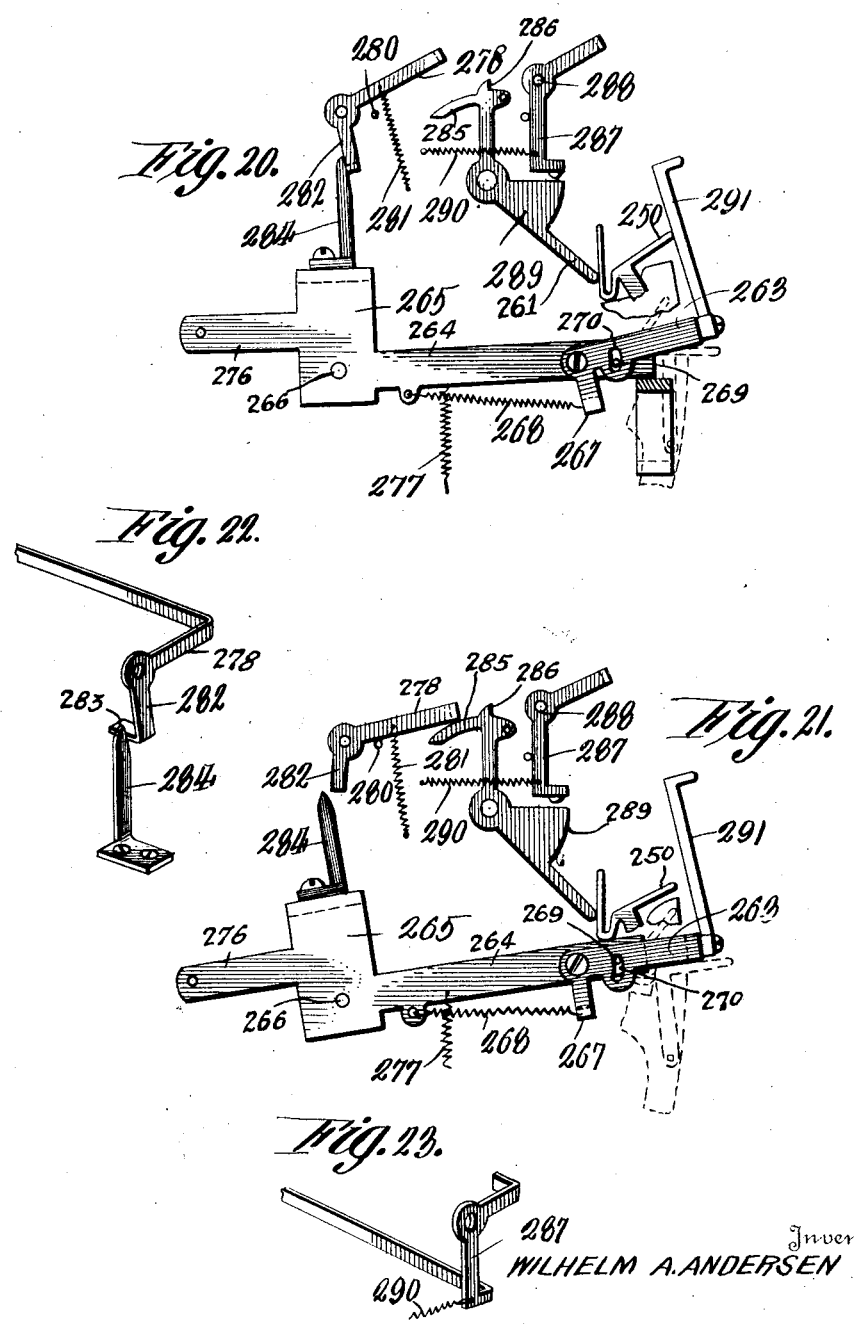

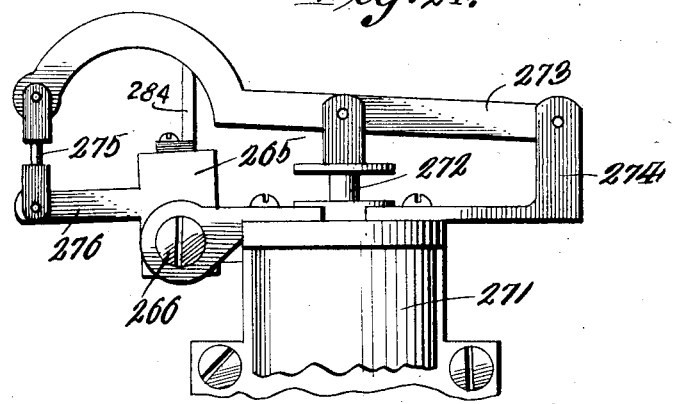
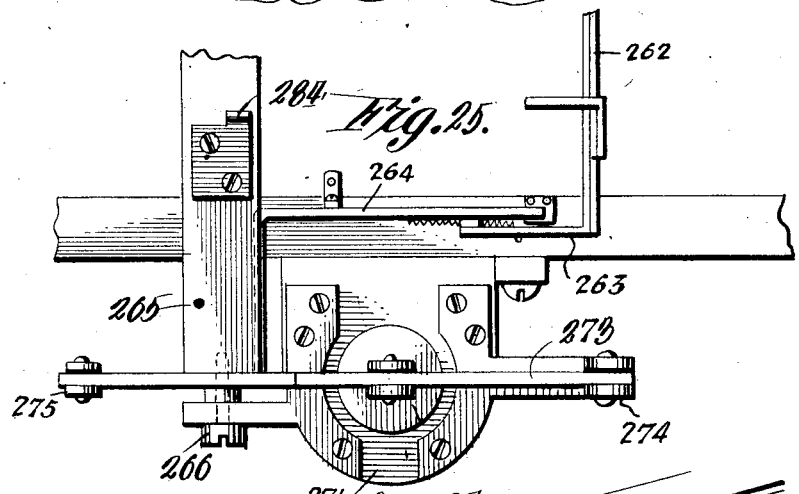
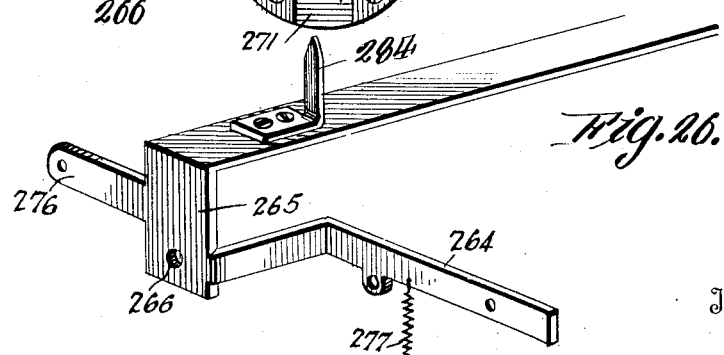

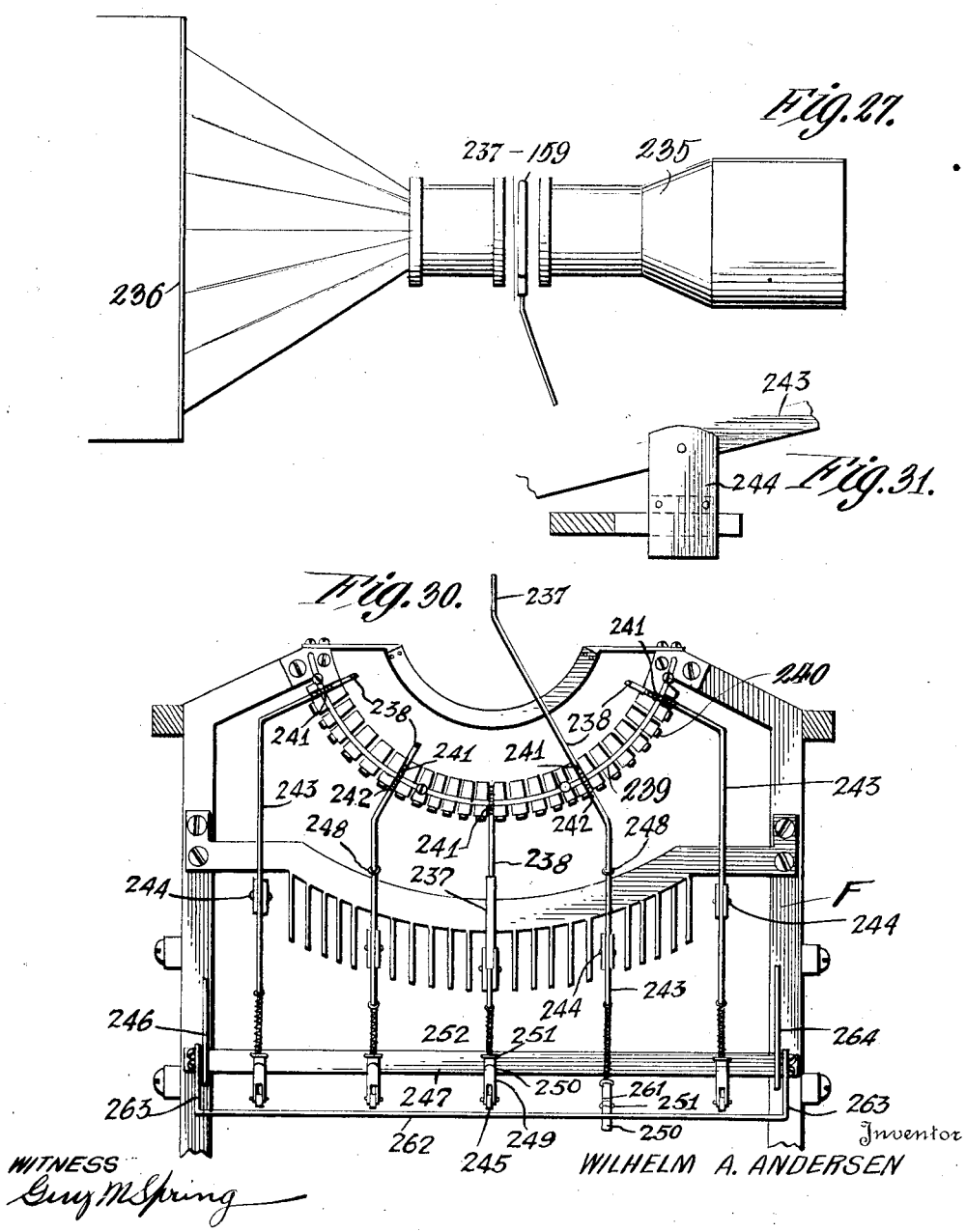

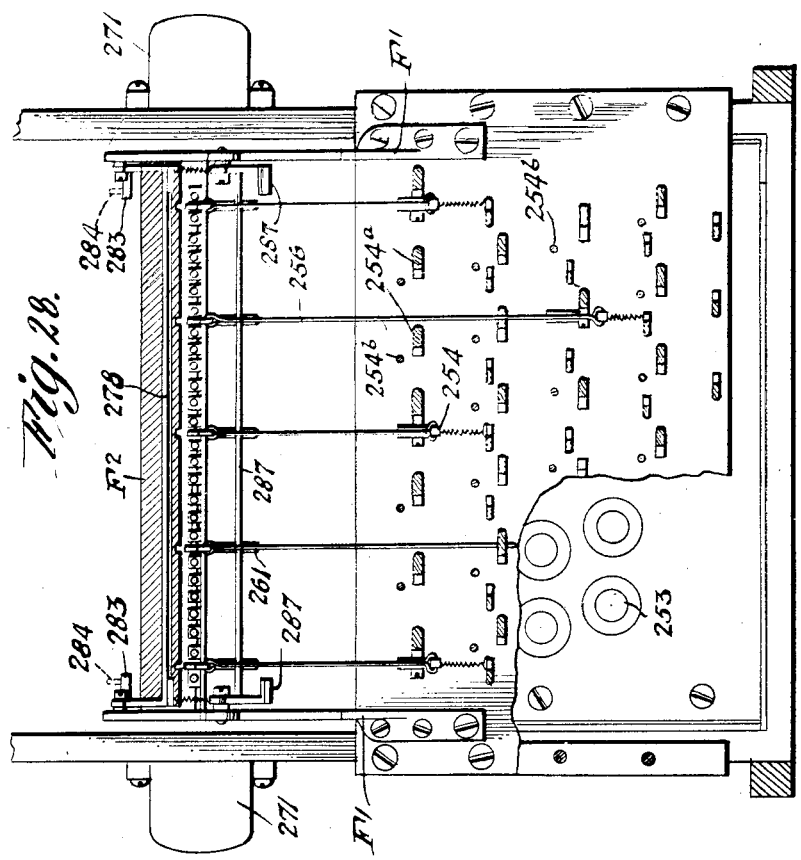

May 21, 1929.   W. A. ANDERSEN   1,714,341
STATION INDICATOR
Filed Nov. 21. 1922   24 Sheets-Sheet 23
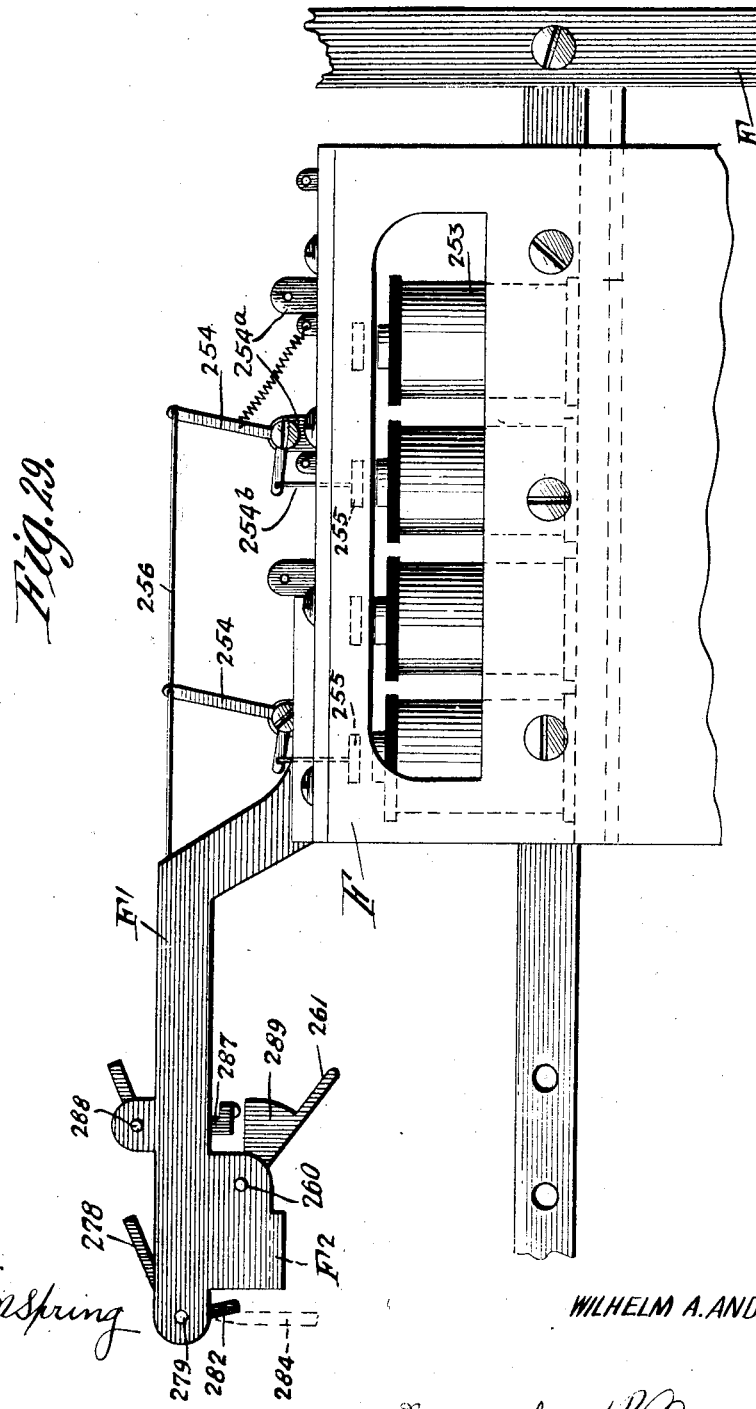
WITNESS
Guy M Spring
Inventor
WILHELM A. ANDERSEN
By Richard B. Owen
Attorney

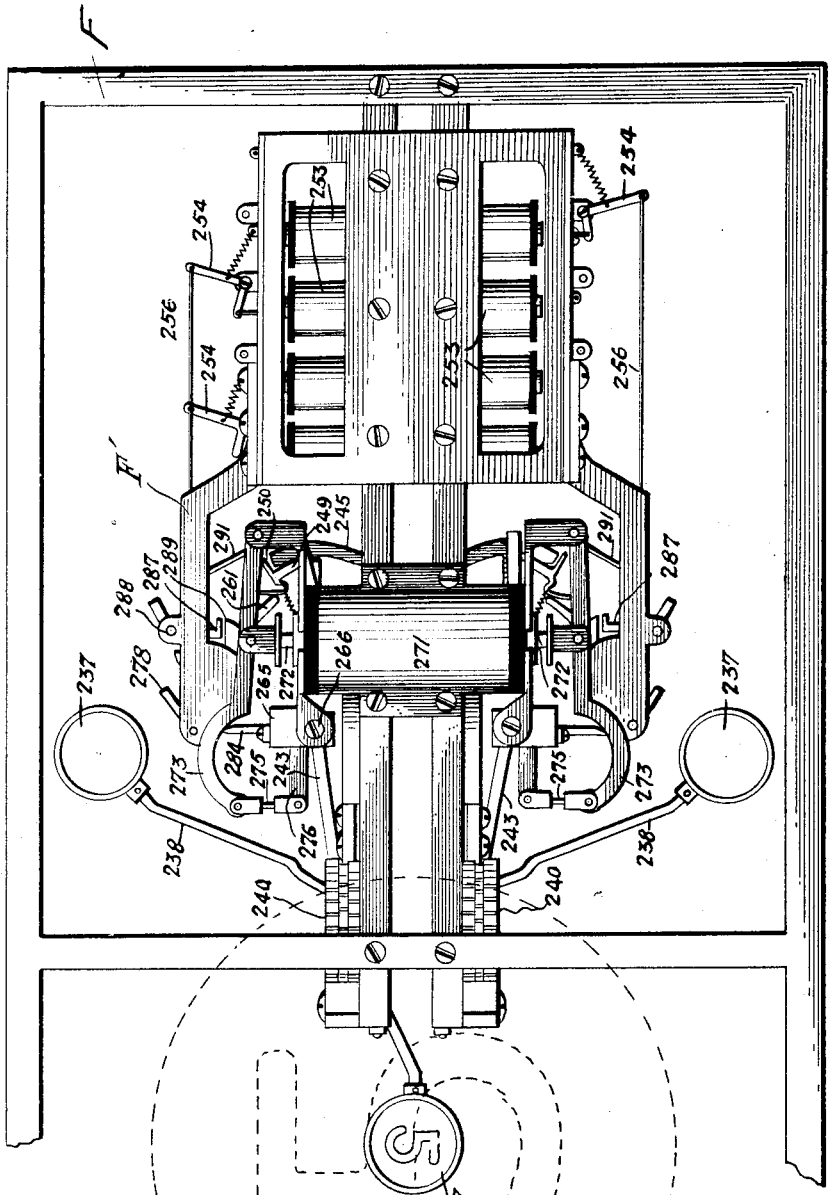

Patented May 21, 1929.

1,714,341

UNITED STATES PATENT OFFICE.

WILHELM A. ANDERSEN, OF JACMEL, HAITI.

STATION INDICATOR.

Application filed November 21, 1922. Serial No. 602,406.

This invention relates to electrical signaling and has special reference to a station indicator operated by electrical means.

In the operation of train supported station indicators many attempts have been made to provide an indicator which would show the name of the station about to be reached by the train, some of these attempts involving mechanical means such as means driven by the movement of the train and displaying the station name on a web or band either endless or finite but all of such mechanically operated systems have proved failures in practice owing to the inherent impossibility of causing the car indication to be displayed at the proper time or for other reasons connected with mechanical defects.

One important object of the present invention is to provide an improved device of this character wherein the display of the station indications will be effected by electromechanical means controlled entirely by the position of the car or train with respect to the station.

It has also been found that even in electrically operated train indicators great objection exists especially where a number of stations are to be indicated because of the complicated and cumberson apparatus required. For instance, attempts have been made to provide separate train circuits for each station, each of which is closed by a circuit closer actuating means adjacent the path of the train. It can readily be seen that in most cases this will lead to a very large number of separate circuits and will require a very great variety of positions for the circuit closing means.

A second important object of the invention is to provide an improved form of electrically operated train supported station indicator so arranged that the number of individual circuits is kept at all times within a reasonable scope. As an example of this it may be stated that the present invention provides, on a railroad line having four hundred stations, for controlling the indications for all of these stations with but twenty different positions for each of two circuit closer actuating means.

A third important object of the invention is to provide a novel arrangement of electrical circuits for controlling the train supported station indicator device.

The fourth important object of the invention is to provide improved apparatus of various kinds for use in connection with such a station indicator.

With the above and other objects in view, the invention consists in general of certain novel details of construction and combinations of parts hereinafter fully described, illustrated in the accompanying drawings, and specifically claimed.

In the accompanying drawings, like characters of reference indicate like parts in the several views, and :—

Figure 1 is a general diagrammatical type view of the wiring for a station indicator constructed in accordance with this invention.

Figure 2 is a side elevation of a certain circuit closer, preferably termed the "group circuit closer" used in connection herewith.

Figure 3 is a plan view of such a circuit closer.

Figure 4 is a detail section on the line 4—4 of Figure 2.

Figure 5 is a detail view showing the relation between the group circuit closer, what is termed a field circuit closer, the magnet and the solenoid group controlled by said circuit closers, the forms of circuit closers shown being slightly modified and employing resistance coils.

Figure 6 is a side elevation of what is preferably termed a direct action outside or roof circuit closer.

Figure 7 is an end elevation showing a pair of such outside circuit closers.

Figure 8 is a side elevation of what is preferably termed an outside or roof indirect action circuit closer.

Figure 8ª is a wiring diagram of the parts shown in Figure 8.

Figure 9 is an end view of the circuit closer shown in Figure 8.

Figure 10 is a detail showing a portion of the wiring in this circuit closer.

Figure 11 is a side elevation of a form of outside circuit closer adapted particularly to forward and backward movement of the car.

Figure 11ª is a wiring diagram for the parts shown in Figure 11.

Figure 12 is an end view thereof.

Figure 13 is a side elevation, partly broken away, of the upper part of a certain annunciator used herewith and having movable sign carriers.

Figure 13ª is a vertical section taken diametrically through a sign supporting ring and showing more fully the parts disclosed in Figure 13.

Figure 13<sup>b</sup> is a side elevation, partly broken away, of the lower part of said annunciator.

Figure 13<sup>c</sup> is a view similar to Figure 13<sup>b</sup> but with certain supporting rings and housings shown in section or broken away to disclose the parts behind, the view being shown with the parts in reverse position to Figure 13<sup>b</sup>.

Figure 13<sup>d</sup> is a plan view of the parts shown in Figure 13.

Figure 13<sup>e</sup> is a side elevation showing the parts in Figures 13 and 13<sup>b</sup> in their relation to each other.

Figure 14:
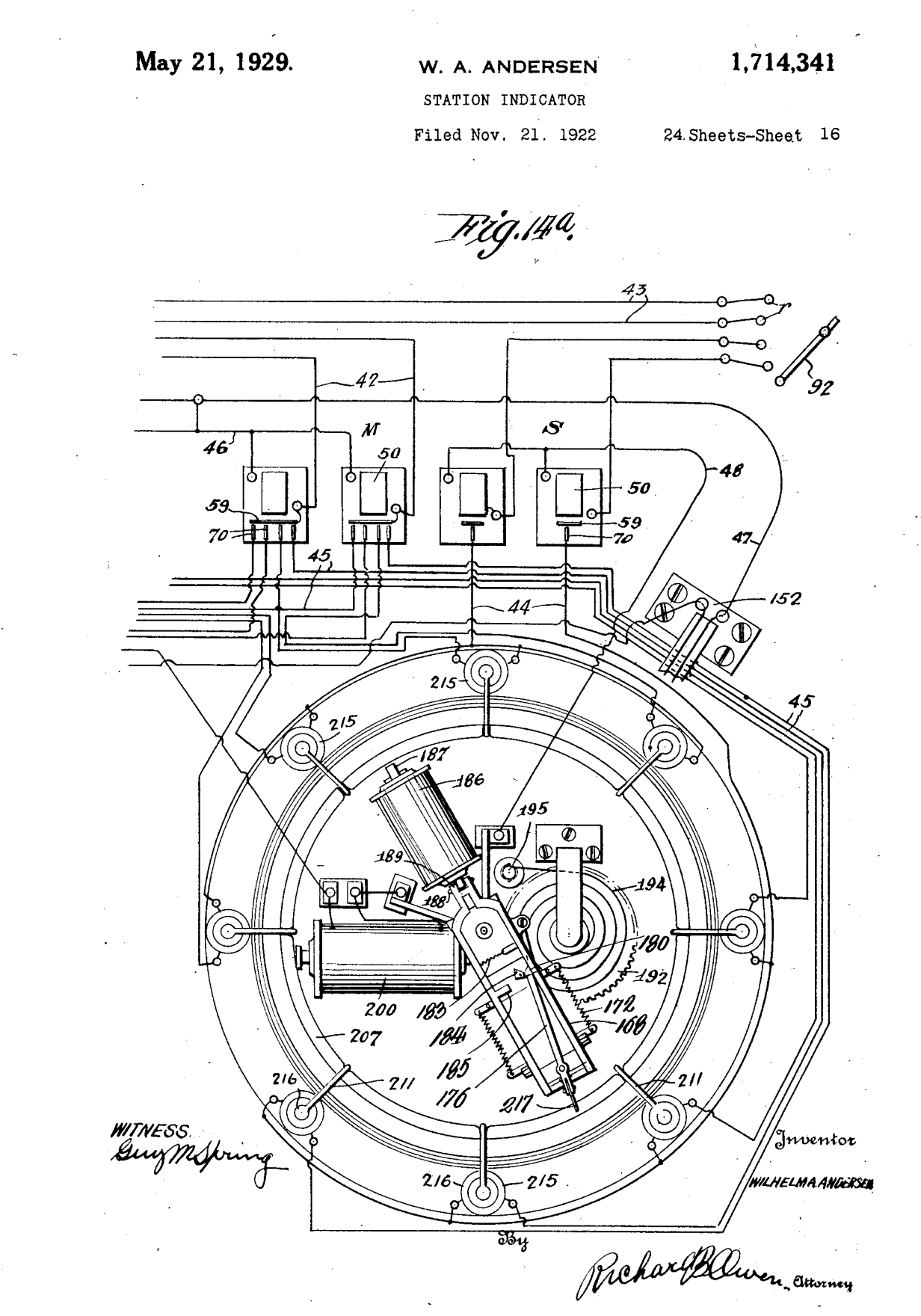

Figure 14 is a plan view, also illustrating a wiring diagram, of the parts of the invention shown in Figure 13.

Figure 14<sup>a</sup> is a plan view of the parts shown in Figure 13<sup>b</sup>, the view also being partly a wiring diagram.

Figure 15 illustrates a certain explanatory diagram, and shows the arrangement of the signs relative to the sign magnets.

Figure 16 shows a modified form of sign displaying mechanism in one position of its operation, a second position being shown in dotted lines.

Figure 17 shows this modified form in a third position of its operation.

Figures 18 and 19 are views showing certain positions of a part of the mechanism associated with Figures 16 and 17.

Figure 20 is a detail view showing what is preferably termed the spanner in one position.

Figure 21 is a detail view showing a second position of said spanner.

Figures 22 and 23 are perspective details of the parts shown in Figures 20 and 21.

Figure 24 is a side view of the upper portion of one of the solenoid devices.

Figure 25 is a top view thereof.

Figure 26 is a detail perspective of certain of the elements of the spanner previously referred to.

Figure 27 is a diagrammatical view of a projecting device used herewith.

Figure 28 is a plan view of the magnet box.

Figure 29 is a side view thereof showing the armatures of the sign magnets.

Figure 30 is a plan view of the sign arm guide sector.

Figure 31 is a detail of the arm mounting.

Figure 32 is a side view of a double set of the sign trains in a common mounting.

Figure 33 is a view showing the arrangement of two station cam bars used herewith.

As explained in the brief description of the figures, Figure 1 is a diagrammatical view of the general wiring scheme of the device, and in this scheme there is disclosed a roof switch which is preferably termed a group roof switch and is indicated at R and a second similar roof switch which is preferably termed a field, or bank roof switch, indicated at R′.

In the present instance, the device is shown as arranged for sixteen station indicators each of which is represented diagrammatically by a magnet and its armature as at I. One of these station indicators is shown in the diagram as being energized and in that particular instance the letter "I" representing the station is primed thus, I′. It will be seen that the circuit closer R has a movable member passing over a number of contacts "r," and similar contacts "r′" and shown for the circuit closer R′ at r′. Communicating with the circuit closer R is a feed wire 40 and a similar feed wire 41 communicates with the circuit closer R′, these feed wires being, of course, of opposite polarity. From each of the contact points r extends a feed wire 42 which passes through a respective multiple circuit closer indicated in general at M and similarly from the contact points r′ extend wires 43 which pass through magnets of single circuit closers S. The circuit closers S each acts to close a circuit through a respective branch line 44 whereto one bank of the indicators I are connected in multiple. The circuit closers M each acts to close separate circuits through branches 45 each controlling a single magnet of one of the banks. Thus, in the present instance, there are four indicators to each bank and each circuit closer M controls the circuit through a group of four indicators each in a separate bank. From this it can be seen that with four points r and four points r′ the entire sixteen indicators I are controlled. It will be observed that all of the circuit closers M are connected in multiple by a wire 46 which is branched to provide branches 47 each leading to a solenoid bank B and similarly the magnets of the circuit closers S are connected in groups to wires 48 each of which leads to a respective bank B.

Suppose now that by any means suitable for the purpose and located adjacent the path of a train, or car, arrangement is made to turn the respective circuit closers R and R′ to definite positions at a given point in advance of the station and that by such arrangement in the particular instant involved, these circuit closers are positioned as shown in Figure 1. Then current will flow through the circuit closer R′ and the contact point which is closed thereby, a wire 43 leading from said point, the circuit closer S controlled by said wire, a wire 48, the solenoid bank B to which said wire is connected, a wire 47, the wire 46, one of the circuit closers M, the wire 42 connected thereto, the closed point r and out through the wire 40. Under these circumstances the action of that particular circuit closer S will be to close a circuit through the branch 44, indicator I′ and respective wire 45. Thus, the particular magnetically controlled indicator I′ will be energized and by suitable mechanism, hereinafter described, a signal may be displayed in accordance with the desired indication.

Bearing this arrangement in mind it will be seen that the number of indicators controlled by the two circuit closers R and R' is the product of the numbers of points $r$ by the number of points $r'$. For instance, four hundred of the indicators I can be controlled by twenty points on each side and while it is preferable to have the same number of points at R as there are at R', yet other combinations may be used. For instance, by having five of the points $r$ and six of the points $r'$, a condition would exist where thirty indicators I would be energized.

Considering the apparatus specifically used to accomplish these purposes and referring particularly to Figures 2, 3, and 4, it will be seen that in these figures there is disclosed the construction of circuit closer such as is indicated at M in Figure 1. In this form of circuit closer there is provided a base 49 whereon is mounted a solenoid 50 having a plunger 51 slidable therethrough and on this plunger is located an adjustable collar 52 which is secured in position on the plunger by a set screw 53. Between the collar 52 and the end of the solenoid 50 is a spring 54 which urges the plunger or core of the solenoid outwardly. A pin 55 on the rear end of this core prevents too great outward movement. At 56 are provided binding posts whereto the wires 42 and 46 are connected. On the base plate 49 are mounted standards 57 to which are pivoted the legs 58 of a circuit closing bar 59. The plunger 51 is provided with a head 60 which is pivotally connected to the lower ends of the legs 58 by needle point bearings 61. Thus, when the solenoid is energized the bar 59 is rocked in one direction and when the solenoid is de-energized this bar is rocked in the opposite direction. Extending laterally from one of the legs 58 is a brace 62 and the bar 59 and brace 62 supporting a contact member 63 having an arcuate lower end 64 against which bears the upper end of a spring contact 65 supported on a bracket 66 mounted on the insulating base 49. On the bracket 66 is a binding post 67 which is connected by a wire 68 with the post 56 to which the wire 42 is connected. Extending upwardly from the insulating base 49 is a standard 69 of insulating material and on top of this standard is mounted a series of spring contact fingers 70 each of which has connected thereto a respective wire 45. It is to be noted that the contact member S is in all respects similar to this contact member except that in place of four of the fingers 70 but one of said fingers is employed. It will also be observed that where each group of the indicators contains a number of indicators other than four the fingers 70 will be increased or decreased in number in accordance therewith.

In Figure 5 is shown a modification of the circuit closers and the figure also shows in a somewhat diagrammatical manner the general arrangement of the device. In this particular form it will be seen that in the arcuate contact members 64 there is provided an insulating block 71, and that there are two of the brackets 66 each having one of the fingers 65 extending up therefrom and engaging said member 64. It will also be noted that the binding posts 67 of the bracket 66 are connected through a resistance coil 68'. From one of these binding posts on each of the circuit closers extend the wires 46 and 48 which go to the solenoid group B. By means of this arrangement whenever the circuit is closed by bringing the bars 59 into contact with the fingers 70 the current for the solenoid group will flow through the resistance coils 68' while, until the bar 59 is in such contact, the resistance coils will be short circuited. This gives a very considerable initial energization of the solenoid group with a decrease of such energization during the movement of the indicator I'.

Considering now the type of circuit closer used on the roof of the car or in other convenient position for actuation by means of fixtures at the station, one such device is illustrated in Figures 6 and 7. In these figures it will be seen that there is provided a base 72 adapted for securing the device on a car roof or other position suitable for the purpose and extending upwardly from this base are insulating standards 73 having bearings 74 at their upper ends. It will be noted from Figure 7 that both the circuit closer R and the circuit closer R' are mounted on the common base 72. On each of the bearings 74 is mounted a shaft 75 and on one end of each shaft is fixed an arm 76 having a finger 77 projecting therefrom, the arm, finger and shaft being all of conducting material. On the other end of each shaft 75 is fixed an arm 78 having a contact finger 79 hinged thereto and urged by a spring 80 into contact with the respective contacts $r$ or $r'$ supported on an insulating block 81 projecting upward from the base 72. At each station, as shown in Figure 3 and also as diagrammatically indicated in Figure 6 there is a pair of cam bars 82 which may, if desired, carry contact strips 83 one of which is connected to the positive and the other to the negative feed wires. These bars 82 are so arranged that they will move the arm 76 to bring the finger 79 into contact with the proper point $r$ or $r'$ to effect the correct indication. This is accomplished as indicated diagrammatically in Figure 6, by having the contact portions of the bars 82 at different heights, thus as the train or car passes along the fingers 77 engage the respective cam bars 82 and the proper circuit is established in accordance with the station which it is desired to indicate. In order to return the arm 76 to its normal position this arm is provided with an extension 84 urged by a spring 85 against a stop 86 mounted on the base 72.

A modification of this form of the device is illustrated in Figures 8, 8ª, 9 and 10 and in this modification it will be seen that there is mounted on an insulating bracket 87 located adjacent a bearing 88 wherein is journalled an angularly disposed tubular arm 89 carrying at its upper end a head 90. This arm has projecting from its upper end the contact finger 91 engageable with one of the cam bars 82. On the other end of the arm 89 is mounted an arcuate arm 92 traversing the contacts r on the bracket 87 and provided with contact engaging members or fingers 99 properly spaced for engagement with such contacts r. On the head 90 is an insulating plate 93 and from this head projects a bearing 94 wherein is mounted a shaft 95 carrying a cam member engaging finger 96 positioned to engage the other cam member 82 at the signal operating station. On this shaft 95 is also an arm 97 traversing the contacts r' mounted on the insulating strip 93. From these contact points r' lead insulated wires 98 which pass through the tubular arm 89 and extend to insulated contact points 99 mounted in the arm 92 and engageable with contacts 100 in accordance with their position and the position of the finger 96 to establish a current flow therethrough. In order to restore the finger 96 to its normal position this finger is provided with an extension 101 whereto is connected a spring 102 which normally holds the extension against a stop 103.

Heretofore we have considered the operation of the device as particularly applied to roof circuit closers wherein the current is supplied from the station or other place exterior of the car. We will now consider a form of circuit closer particularly adapted to be closed by stationary cams supported near the path of the train but in which the current flowing through the circuit closer is derived from a battery or other suitable source of power supported on the car. In this form of the circuit closer there is provided, as shown in Figure 12, a base 104 whereon is mounted a casing 105 in which is supported a pair of bearings 106 only one of which is shown, the other being hidden by the casing 105. In each of these bearings is a shaft 107 whereon is mounted a hollow arm 108 normally held in a vertical position by means of spring 109. On this shaft 107 is also mounted a pair of contact plates 110 which are normally kept in neutral position by means of springs 111 connected to the base 104 and to fingers 112 projecting from said plates. These plates turn freely on the shaft 107. Within the casing 105 is a bracket or support 113 whereon are two sets of the contacts r and two sets of contacts 114, the contacts r of one set being connected to the similar contacts of the other set and in like manner the contacts 114 of both sets being connected. On each of the members 110 is an insulating block 115 whereon are mounted a series of contact fingers 116 adapted for engagement by contact fingers 117 on the lower end of an extension 118 of the tube 108, this extension swinging with the tube and engaging the respective lugs 119 on the members 110 in accordance with the direction of its movement. On the bracket 113 is a contact strip 120 engageable by a contact 121 insulatedly mounted in the respective member 110. Each of the fingers 116 is connected by a wire 122 with a respective contact 123 insulatedly mounted in the members 110 and adapted for engagement with the contacts r on the member 113. The contact 121 is connected by a wire 124 with a contact 125 on the respective member 115, this contact being engageable by a contact finger 126 on the lower end of the tube 108. At the upper end of the tube 108 is a head 127 carrying an insulation 128 and extending from this head is a bearing 129 wherein is mounted a shaft 130 having at one end an arm 131 provided with a contact finger 132 engageable with one of the station cams 82. The other cam 82 is engaged by a contact 133 mounted on the tube 108 above the head 127. On the opposite end of the shaft 130 is an arm 134 traveling over one or the other of the two sets of contacts r', which are connected together in pairs and from which insulated wires 135 lead downward to the respective fingers 117. Leading to the contact plates 120 is a wire 136 to which these plates are connected in multiple and to the contact 133 leads a wire 137 which is connected to the contact finger 126. The wire 138 connects with the contacts 114 and connecting the two members 82 is a wire 139. Suppose now that all parts are in their working positions, the following circuit is closed: source of energy, wire 136, contact plate 120, contact point 121, wire 124, contact finger 125, contact spring 126, wire 137, head piece 133, first cam bar 82, wire 139, second cam bar 82, contact head 132, contact arm 134, contact 21, wire 135, spring 117, contact member 116, wire 122, contact 123, contact r, wire 42, apparatus for displaying the sign, wire 43 and the same parts just enumerated and appertaining to lines 43, as are, contact r', contact 123, wire 122, contact member 116, contact spring 117, wire 135, contact 100, contact arm 134, head piece 132, third cam bar 82, wire 139, fourth cam bar 82, head piece 133, wire 137, contact spring 126, contact finger 125, wire 124, contact point 121, contact plate 120, wire 138 and source of energy.

I have illustrated in the drawings also two forms of annunciator both of which are based on the principle of making the signs appear at the same stop which sign is visible to the passengers either direct or indirect.

The first of these annunciators is arranged to actuate certain rotary sign carriers which are stopped in proper position by means of mechanism controlled by the indicator apparatus indicated in the diagrammatical view at I. In order to effect this operation there is provided a detector and stop device arranged to stop the rotation of the carrier at the proper point and means is employed to swing the sign bearing arms into their proper position for display at the time it is stopped.

To this end it is preferred that the moving parts throughout the device be duplicated since by so doing the turn tables which carry the signal devices may be made of much smaller diameter. Referring now to Figures 13, 14 and their associated figures it will be seen that there is provided a base 150, preferably covered with a casing 151 and at each end of this base is mounted one of the sign displaying devices. For each of these devices there is provided a foot step bearing 151' and above this bearing is a standard 152. Supported in the footstep bearing and standard is a vertical shaft 153 whereon is mounted a hub 154 from which radiate arms 155 supporting on their outer ends a sign carrying ring or turn table 156. This ring 156 is slotted at intervals as at 157 and pivoted in each of the slots is an arm 158 carrying on its outer end a sign 159. This sign may have any suitable markings thereon, as for instance, a number 160 indicative of the station being approached and may either be opaque so that it may be read directly or transparent so that the name or other marking may be projected on a screen as will hereinafter be described. Each of the arms 158 is held in raised position by means of a suitable spring 161, and depending from each arm is a finger 162 which engages a portion of the ring to limit the upward movement of the arm. These turn tables are so arranged that each arm may be brought, by the rotation of the table, into what is preferably termed the display position and opposite the slot which is in this display position there is provided a stop stand 163 extending upward from the base so that when the arm 158 is swung downward the signal 159 will rest on this stand.

Below each turn is located the collar 164 which carries an arm 165 projecting in one direction and an arm 166 projecting in the opposite direction. These arms support certain portions of the detector and stop device as will now be described. On this arm 166 are pivoted the lower ends of links 167 which have their upper ends pivoted in turn to a stopper frame 168 having at its outer end a depending portion 169 carrying an extension finger 170. Depending from the stopper frame is an arm 171 to which is connected one end of a spring 172 the other end of said spring being connected to a lug 173 on the arm 166. By this means the stopper frame is constantly urged outward. When these parts are in the position relative to the base as is shown in Figure 13$^c$ they are releasably locked in that position by the following means: On the bar 166 is a shelf or projection 174 from which a post 175 extends upward and has pivoted on its upper end a lever 176 having a downwardly extending inner end 177 which engages a pawl 180 carried by the frame 168. (See Figure 14$^a$). This lever 176 is constantly urged into this engaging position by means of a spring 181 surrounding the post 175. This pawl 180 is pivoted to the frame and its forward end works through a slot in the side of said frame 168, being urged into that position by a spring 183. A stop 184 is carried by the frame 168 and serves to limit the movement of said pawl. Similarly a stop 185 is carried by the frame 168 and limits the movement of the lever 176 in one direction. Thus, when the lever 176 is moved to engage the stop 185 the springs 172 contract and draw the frame 168 outward as shown in Figure 14. It will be noted that the pawl 180 is bevelled so that movement of the frame inwardly is permitted since the bevelled face of the pawl will swing the latter outward against the action of its spring and thus allow the downwardly bent end 177 of the lever 176 to pass. Mounted on the arm 165 is a solenoid 186 having a core 187 carrying at its end adjacent the frame 168 a pin 188 which engages in a slotted end 189 formed on said frame. The arrangement is such that when the solenoid 186 is energized the frame 168 is moved inwardly. Beneath the bar 166 is secured a second solenoid 190 having plunger or core 190$^a$ which is normally urged outwardly by a spring 190$^b$, energization of this solenoid drawing the core 190$^a$ inward towards the shaft 153. The purpose of this solenoid will be presently explained.

Leaving now, for instance, the devices just mentioned the manner in which the turn table is rotated to bring it into the proper positions will be considered. On the shaft 153 is fixed a pinion 191 wherewith meshes a gear 192. A bracket 192$^a$ is secured to the base 150 and in this bracket is supported a shaft 193 whereto is connected one end of a spring 194, the other end of said spring being connected to a post 195 secured to the base 150. Formed with the gear 191 is a ratchet 196 and this gear and ratchet are rotatably mounted on the shaft 193. Fixed on said shaft 193 is a segmental gear 197 wherewith meshes a rack 198 carried by the core 199 of a solenoid 200 mounted on the base 150. The movement of the core 199 is controlled by stops 201. On the sector 197 is a post 202 carrying a spring pressed pawl 203 which engages the ratchet 196. Thus when the solenoid 200 is energized the solenoid plunger actuates the sector 197 and winds the spring 194. At the same time the pawl 203 moves freely over the ratchet 196 but, when the solenoid 200 is de-energized the action of the spring 194 returns the core to its former position and the pawl 203, engaging the ratchet 196 rotates the gear 192 to a certain extent and thereby rotates the shaft 153 through the connection of said gear with the pinion 191.

We will now consider the particular devices which control the individual signs through the action of parts previously described. On the base 150 are mounted supports 204 whereon is a ring 205 carrying supports 206 which in turn support a ring 207. The ring 207 is L-shaped in cross section and is provided at spaced intervals in its vertical limb with slots 208 equal in number to the signs 159. Mounted on the flat or horizontal portion of the ring 207 are supports 209 carrying a ring 210 provided with slots each receiving a lever 211 pivoted intermediate its ends in said slots. The inner ends of the levers 211 project downward and enter the slots 208 as indicated at 212. In the lower portions of the slots 208 are mounted the levers 213 each of which engages beneath the end 212 of a respective lever 211 so as to hold this end from downward movement. The levers 213 and 211 are connected by springs 214 which serve to hold these levers in the position shown in Figure 13$^c$. Mounted on the rings 205 are a series of magnets 215 arranged to attract armatures 216 on the levers 211. These magnets 215 correspond in number to the signs 159 and are the magnets which are controlled by the means shown in Figure 1, corresponding to the magnets I. Thus, whenever a respective magnet 215 is energized the lever 211 will be moved thereby and the parts will assume the position shown at the left of Figure 13$^c$. It will be noted that in this position the inner end of the lever projects upward and lies in the path of a blade 217 which projects from the outer end of the lever 176 previously mentioned so that when this blade strikes the lever 211 the lever 176 will be swung to engage the stop 185 and will thus release the frame 168 so that the projection 170 may enter the respective slot 208 opposite to which it is positioned, push back the lever 213 and release the lever 211 to permit it to assume the position shown at the right of Figure 13$^c$. Thus, by the energization of a particular magnet 215 during the rotary movement of the turn table the latter is brought to rest in a specific position so that the function of the magnets 215 is to control the position of the turn table in accordance with which all said magnets are energized. It will be noted that as long as the frame 168 is pushed outwardly the finger or projection 170 will engage in the respective slot 208 and will thereby hold the turn table from rotation it being impossible to rotate the latter until the solenoid 186 has been again energized. The consequence of the movement which is described is that the particular sign desired to be displayed is brought into position to swing down on the stop 163. In order to swing the sign down there is provided on the shaft 153 a collar 218 having an arm 219 projecting therefrom and on this arm is pivoted the angular portion of a bell crank lever 220 one arm of which extends downwardly from engagement by a pin 221 on the frame 168, the other arm of said lever passing through a slot in the shaft 153 and engaging beneath the lower end of a plunger 222 extending upward through the upper part of the shaft 153 and terminating at its top in a head 223. (See Figure 13$^a$.) On the bracket 152 is mounted a bracket arm 224 and a second bracket arm 225 placed diametrically opposite the first bracket arm. On the arm 225 is pivoted an angular portion of a bell crank lever 226 one end of which rests on the head 223 while the other arm is pivotally connected to the end of a hook bar 227 also supported at its lower portion from the arm 224 by a link 228. On the lower end or outer end of the bar 227 is pivoted, as at 230$^a$, the angular portion of a T-shaped lever 229 one arm of which is connected to the bar 227 by a spring 230, being limited in movement in the direction in which it is urged by said spring by a lug 231 carried by the lever and contacting with the bar 227. The stem of this T-shaped lever is provided on its lower end with a hook 232 which engages the finger 162 formed on the respective signal arm 158. The remaining arm of the lever 229 is provided with an armature 233 arranged for attraction by a magnet 234 mounted on the arm 224. At this time it is to be observed that the three solenoids 186, 190, 200 appertaining to one turn table and magnet 234 appertaining to the other turn table form what is termed the solenoid bank as shown in Fig. 1, so that when one is energized, all are energized. Consequently when a turntable has been stopped by the operation of the respective magnet 215 as previously described, and the frame 168 is released, the action of this frame will move the bar 227 upward and will thus cause the hook 232 to operate the arm 158 and the parts will remain in this position until a second energization of the solenoid bank takes place whereupon bar 227 releases the finger 162 and the signal which has been displayed will rise to its normal position, as it were. It is remembered that the magnet 234 on one side of the apparatus is connected to the solenoids on the other side of the apparatus so that the two turn tables can be used alternately and at the same time when one signal is selected to be displayed by the solenoid group in one turn table device, the signal which has been previously displayed in the other turn table device will be released by the magnet 234 being connected with said selecting solenoid group. If only one turn table is provided, the magnet 234 is omitted.

It will be noted that in order to prevent premature rotation of the turn table the energization of the solenoid 186 which frees the end 170 from the slot is accompanied by similar energization of the solenoid 190 so that the core 190$^a$ of this solenoid will engage in the slot simultaneously with the freeing of the finger 170 therefrom. Consequently the shaft 153 is held from rotation and the spring 194 is wound up.

As will be seen from Figure 27 the signal 159 may be swung into position in a projecting device 235 so that the sign thereon may be projected onto a screen 236 in view of the passengers. It is found that this is desirable at times in order to keep the size of the signs down and yet have the projection legible.

There is also provided, in connection with this invention a second form of annunciator wherein the turn table feature is eliminated and the annunciator operates somewhat after the fashion of the type bars of a typewriter, the signs being mounted in an analogous manner to such type bars.

Certain of the details of this particular mechanism will now be described and afterwards the manner in which these details are assembled will be set forth. In this type of device each individual signal 237 is provided with a supporting bar 238 mounted at one end on a rod 239 extending arcuately through a frame 240 as shown in Figure 30. The end of the bar 238 which is mounted on said rod is provided with gear teeth to form a segmental gear 241 wherewith meshes a gear segment 242 on the end of a lever 243 pivoted to said frame as at 244. (See Figures 16 and 17.) The forward end of this lever terminates in an arcuate head 245 having an angularly disposed lower end 246 forming a finger for engagement beneath a stop bar 247. A spring 248 normally holds this lever with the finger against said stop bar. On the head 245 are pivoted the arms of a yoke 249 having a forward extension 250 adapted to rest on the upper end of the head 245 and project forwardly therefrom when the yoke is swung upward. Projecting from the yoke 249 at an angle to the finger 250 is a finger 251 and a spring 252 normally holds the finger 250 out of engagement with the head 245. At 253 is shown one of the magnets which control the individual signals and pivoted, upon a support 354$^a$ located above this magnet, by its angular portion is a bell crank lever 254 having one arm extending in a substantially horizontal direction and connected by a rod 254$^b$ to the armature 255 of said magnet. The other arm of said lever extends upward and is connected by a rod or link 256 with the upper end of a trip lever 257 oscillating between stops 258 and 259. These trip levers are mounted on a rod 260 and have a downwardly extending finger 261 engaging the finger 251.

At 262 is an actuating bar which I may preferably term a spanner bar. This bar oscillates in a substantially vertical manner and in a path eccentrical to the shaft 239 and just beyond the head 245. The means for oscillating this bar and controlling the same will be described hereafter but for the purpose of understanding this portion of the apparatus let it be observed that the bar is oscillated and that one of the magnets 253 is energized. The consequence of this will be that through the levers 254 and 257 the finger 250 will be thrown outward to rest on top of the head 245. It will be understood from what follows later that this movement takes place while the bar is raised as shown in dotted line portion in Figure 16. In consequence of the projection of said finger 250 downward movement of the bar carries with it the head 245 and thereby moves the signal 237 into display position.

Considering now the operation of the bar 262. At each end of this bar is provided an arm 263 which is pivoted to an arm 264 extending from a yoke member 265 pivoted as at 266. Extending downward from the pivotal connections of the arms 263 and 264 are arms 267 and springs 268 connect these arms with the arms 264 so that the bar 262 is normally held downward. The movements of the arms 263 are limited by means of a pin 269 mounted on the arm 264 and engaging a slot 270 in one of the arms 263. At 271 is a solenoid which is provided with a core 272 connected to a lever 273 intermediate its ends, one end of the lever being pivoted to a bracket 274 fixed to the solenoid while the other end is connected by an adjustable link 275 with an arm 276 projecting from the member 265 thus when the solenoid is energized the lever 273 is moved downward and the bar 262 is raised. When the solenoid is deenergized a spring 277 forces the bar 262 again downward and the action takes place as previously described. It will be obvious that the upward movement of the bar after a finger 250 was projected forwardly would interfere with the operation of the device and probably damage the parts, it being necessary that the bar 262 rise above the forwardly projecting position of said finger prior to its forward movement. Now in order to control this feature of the device the following mechanism is used.

A yoke member 278 has the ends of its arms pivoted as at 279 and is normally held against a stop 280 by means of a spring 281. Depending from one of the arms of this yoke member is an arm 282 having an angularly disposed end 283 engageable by a finger 284 projecting upward from the yoke member 265. When thus engaged the yoke member 278 is raised as shown in Figure 20. The transverse portion of the yoke member 278 is positioned to swing into and out of engagement with an arcuate head 285 formed on each of the levers 257 and provided with a ratchet 286. At 287 is a frame having its end members pivoted at 288 and one of the side members of this frame extends across the paths of projections 289 formed on the levers 257 adjacent their finger provided ends. This frame 287 is normally held with the side mentioned in engagement with said projections by a spring 290. On the bar 262 is a trip member 291 engageable, when the bar is raised, with the remaining side of the frame 287. When this trip member thus engages the frame the levers 257 are freed and movement is permitted.

From the foregoing it will be seen that until the bar reaches nearly the upward limit of its movement there can be no movement of the fingers 261 and consequently there can be no projection of the finger 250 over the head 245 for engagement by the bar on its downward movement.

As the bar 262 lifts the finger 284 moves away from the lever or yoke 278 and this drops down so that when the finger 261 moves the yoke 278 engages the ratchet tooth 286 thus holding the finger raised during the downward movement of said bar. So long as one of the fingers is raised the portion 289 will prevent movement of the frame 287 back to its normal position and consequently this movement cannot take place prematurely but only after the bar 262 has dropped sufficiently far so that the finger 284 trips the yoke 278 and thereby releases the lever 257 and permits the finger 261 to drop back.

It will be seen from Figures 28, 29, and 30 that all of these parts are suitably mounted in a typewriter like frame F, the necessary brackets, lugs and other features being positioned to afford the proper mounting. It is not deemed necessary to go into detail description of these several lugs, brackets and minor parts as the same are all well known in the art. Attention is called, however, to Figure 32 where it is seen that the device may be made as a double device all mounted in a common frame F, it will be noted that, in this case, the solenoid 271 operates with two plungers and two bars 262. As shown in Figures 28, 29 and 32, the pivots of the trip levers 257, yoke member 278 and frame 287, are carried by arms F' which constitute a part of the frame and are connected at their forward ends by a cross bar F².

There has thus been provided a highly efficient device of the kind described and for the purposes specified.

It is obvious that minor changes may be made in the form and construction of the invention without departing from the material principles thereof. It is not therefore desired to confine the invention to the exact form herein shown and described, but it is wished to include all such as properly come within the scope claimed.

Having thus described the invention what is claimed as new, is:—

1. In a station indicating system, a plurality of sign controlling devices, said devices being divided in groups, circuit closers controlling said groups, a fixed station device, a source of energy, means carried by the car and adapted to engage with the device fixed at the station for cooperatively selecting and connecting one of said circuit closers with one pole of said source of energy, other circuit closers each controlling one of said sign controlling devices in each group, a second fixed station device, other means carried by the car and adapted to engage with the second device fixed at said station for cooperatively selecting and connecting one of the last mentioned circuit closers with the other pole of said source of energy.

2. In an indicator, a turn table, a series of signal supporting arms pivoted adjacent the periphery of said turn table and normally held out of display position, means to rotate said turn table, said signals being movable to a position for display common to all of said signals, electrically controlled means to selectively stop the rotating turn table at a desired position for exhibition of that one signal at the display place, means to move said signal into display position, and means to restore said display signal into its normal position.

3. A selective circuit closer for signal circuits including a base, a bearing supported on the base, a shaft journalled in said bearing, a contact arm projecting from said shaft to move the same, an arcuate insulating bar, contacts spaced on said insulating bar, a contact arm mounted on said shaft and engaging said points selectively, a second bearing supported on the first contact arm, a shaft in the second bearing, a cam bar engaging contact arm mounted on said shaft, switch points arranged concentrically of the second shaft in a spaced series and a second contact arm on the second shaft engaging said switch points selectively.

4. In an indicator, a plurality of sign supporting members, said sign supporting members tiltable into and out of display position, spring means normally holding said members out of display position, electrically operated means to select one of said sign supporting members to be brought into display position, and mechanical means to display said selected member.

5. In a signal displaying device, a swinging signal arm, a power device to swing said arm including an arm actuating lever, said arm and lever being normally out of operative range of said power device, projectible means mounted on said lever, and electromagnetic means to project said projectible means into the operative range of said power device.

6. In a signal displaying device, a swinging signal arm, a power device to swing said arm including an arm actuating lever, said arm and lever being normally out of operative range of said power device, projectible means mounted on said lever, electro-magnetic means to project said projectible means into the operative range of said power device, and means for timing the projection of said projectible means.

In testimony whereof I affix my signature.

WILHELM A. ANDERSEN.